(12) United States Patent
Sun et al.

(10) Patent No.: US 10,706,191 B2
(45) Date of Patent: Jul. 7, 2020

(54) SYSTEMS AND METHODS FOR GENERATING A GEO-LEVEL HIERARCHICAL BAYESIAN MODEL

(71) Applicant: Google Inc., Mountain View, CA (US)

(72) Inventors: Yunting Sun, Mountain View, CA (US); Yuxue Jin, Mountain View, CA (US); James Koehler, Mountain View, CA (US); Xiaojing Huang, Mountain View, CA (US); David Chan, Mountain View, CA (US); Yueqing Wang, Mountain View, CA (US); Conor Sontag, Mountain View, CA (US); Shi Zhong, Mountain View, CA (US); Luis Gonzalez Perez, Mountain View, CA (US)

(73) Assignee: Google LLC, Mountain View, CA (US)

( * ) Notice: Subject to any disclaimer, the term of this patent is extended or adjusted under 35 U.S.C. 154(b) by 345 days.

(21) Appl. No.: 15/693,326

(22) Filed: Aug. 31, 2017

(65) Prior Publication Data
US 2019/0065638 A1   Feb. 28, 2019

(51) Int. Cl.
*H04N 21/25*  (2011.01)
*G06F 30/20*  (2020.01)
(Continued)

(52) U.S. Cl.
CPC ............. *G06F 30/20* (2020.01); *G06F 17/18* (2013.01); *G06T 7/11* (2017.01); *H04L 65/10* (2013.01);
(Continued)

(58) Field of Classification Search
CPC ............. G06Q 30/02; G06Q 30/0271; G06Q 30/0246; G06Q 30/0259; G06F 16/9537; A61K 31/70; H04N 21/25; H04L 65/10
See application file for complete search history.

(56) References Cited

U.S. PATENT DOCUMENTS 7,873,535 B2    1/2011  Umblijs et al.
8,296,176 B1 *  10/2012 Chatwin ............ G06Q 30/0271
                                                705/7.29
(Continued)

OTHER PUBLICATIONS

Montgomery, A. L., "Hierarchical Bayes Models for micro-marketing strategies", Case studies in Bayesian Statistics, Springer-Verlag: New York, pp. 95-141, 1997.*

(Continued)

*Primary Examiner* — Kandasamy Thangavelu
(74) *Attorney, Agent, or Firm* — Foley & Lardner LLP

(57) ABSTRACT

Systems, methods, and computer-readable storage media that may be used to generate a Bayesian hierarchical model. One method includes generating a plurality of geographic regions by grouping one or more geographic sub-regions into each of the plurality of geographic regions. The method further includes receiving data for the geographic sub-regions, the data including responses, content inputs, content types, and location identifiers. The method further includes generating geo-level data from the received data by grouping the responses and content inputs of the received data based on a correlation of the location identifiers of the received data to the plurality of geographic regions. The method includes fitting a Bayesian hierarchical model based on at least the geo-level data, the content types, and the geographic regions and determining a content input mix for the content types for each geographic region based on the Bayesian hierarchical model and a content input constraint.

20 Claims, 19 Drawing Sheets

(51) Int. Cl.
G06F 17/18 (2006.01)
H04L 29/06 (2006.01)
G06T 7/11 (2017.01)
G06Q 30/02 (2012.01)
G06F 111/10 (2020.01)

(52) U.S. Cl.
CPC .......... *H04N 21/25* (2013.01); *G06F 2111/10* (2020.01); *G06Q 30/02* (2013.01)

(56) References Cited

U.S. PATENT DOCUMENTS

| | | | |
|---|---|---|---|
| 2011/0201566 A1* | 8/2011 | Fernandes | A61K 31/70 514/29 |
| 2011/0276392 A1 | 11/2011 | Vaver et al. | |
| 2013/0124263 A1* | 5/2013 | Amaro | G06Q 30/02 705/7.34 |
| 2014/0236678 A1* | 8/2014 | Akerman | G06F 16/9537 705/7.34 |
| 2014/0278930 A1* | 9/2014 | Brixius | G06Q 30/0246 705/14.45 |
| 2016/0140577 A1 | 5/2016 | Morley | |
| 2017/0032418 A1* | 2/2017 | Niesen | G06Q 30/0259 |

OTHER PUBLICATIONS

Cain, P.M. (2005). Modelling and forecasting brand share: A dynamic demand system approach. http://www.marketscienceconsulting.com/wp-content/uploads/2012/10/Modelling-and-Forecasting-Brand-Share.pdf.

Gelman, A. (2006). Prior distributions for variance parameters in hierarchical models. Bayesian Analysis, (3):515-533 https://projecteuclid.org/euclid.ba/1340371048.

Gelman, A., and Pardoe, I. (2006). Bayesian measures of explained variance and pooling in multilevel (hierarchical) models. Technometrics, 48(2)(:241-251. www.stat.columbia.edu/~gelman/research/published/rsquared.pdf.

Gelman, A., Lee, D., and Guo, J. (2015). Stan: A probabilistic programming language for Bayesian inference and optimization. Journal of Educational and Behavior Science www.stat.columbia.edu/~gelman/research/published/stan_jebs_2.pdf.

Geo-level Bayesian Hierarchical Media Mix Modeling https://static.googleusercontent.com/media/research.google.com/en//pubs/archive/46000.pdf.

Jastram, R.W. (1955). A treatment of distributed lags in the theory of advertising expenditure. Journal of Marketing, 20(1):36-46.

Jin, Y., Wang, Y., Sun, &., Chan, D., and Koehler, J. (2017). Bayesian methods for media mix modeling with carryover and shape effects.

Little, J.D.C. (1979). Aggregate advertising models: The state of the art . Operations Research, 27(4):629-667.

Neal, R.M. (2003). Slice sampling. The Annals of Statistics, 31(3):705{767.

Palda, K.S. (1965). The measurement of cumulative advertising effects. The Journal of Business 38(2):162-179.

Perry, M. and Chan, D. (2017). Challenges to inference in media mix models https://static.googleusercontent.com/media/research.google.com/en//pubs/archive/45998.pdf.

R Core Team (2015). R: A Language and Environmental for Statistical Computing. R. Foundation for Statistical Computing, Vienna, Austria.

Rossi, P.E., Allenby, G.M., and McCulloch, R. (2005). Bayesian Statistics and Marketing.

Tellis, G.J. (2006). Modeling marketing mix. Handbook of marketing research pp. 506-522.

Vaver, J. and Koehler, J. (2011). Measuring Ad Effectiveness Using Geo Experiments.

Wang, Y., Jin, Y., Chan, D., and Koehler, J. (2017). A hierarchical Bayesian approach to improve media mix models using category data. https://static.googleusercontent.com/media/research.google.com/en//pubs/archive/45999.pdf.

Watanabe, S. (2010). Asymptotic equivalence of bayes cross validation and widely applicable information criterion in singular learning theory. Journal of Machine Learning Research, (11):3571-3594.

Zhang, S. and Vaver, J. (2017). Introduction to the aggregate marketing system simulator.

Gelman, A. and Hill, J. (2006). Data Analysis Using Regression and Multilevel/Hierarchical Models. Cambridge University Press, 1 edition.

International Search Report and Written Opinion received for PCT Application No. PCT/US2018/037927, dated Nov. 15, 2018, 18 Pages.

Yueqing Wang: "A Hierarchical Bayesian Approach to Improve Media Mix Models Using Category Data", Apr. 7, 2017 (Apr. 7, 2017), pp. 1-46, XP055520930, Retrieved from the internet: URL: https://static.googleusercontent.com/media/research.google.com/en//pubs/archive/45999.pdf [retrieved on Nov. 5, 2018] pp. 2, 3, 5 and 16.

Yunting Sun et al: "Geo-level Bayesian Hierarchical Media Mix Modeling", 2017, pp. 1-34, XP055520886, Retrieved from the Internet: URL:https://ai.google/research/pubs/pub46000.pdf [retrieved on May 11, 2018] the whole document.

International Preliminary Report on Patentability, Ch. I, for PCT Appln. Ser. No. PCT/US2018/037927 dated Mar. 12, 2020 (11 pages).

* cited by examiner

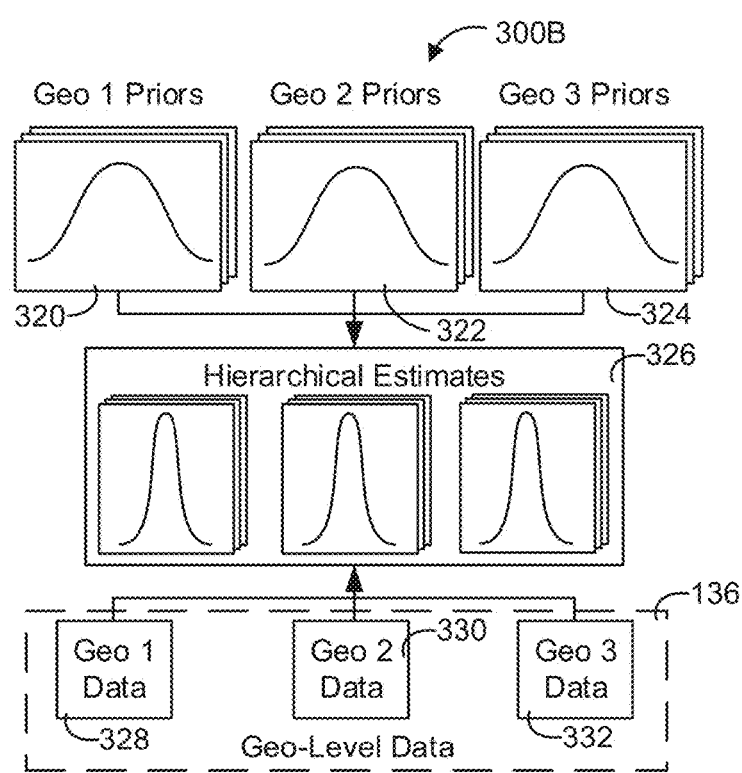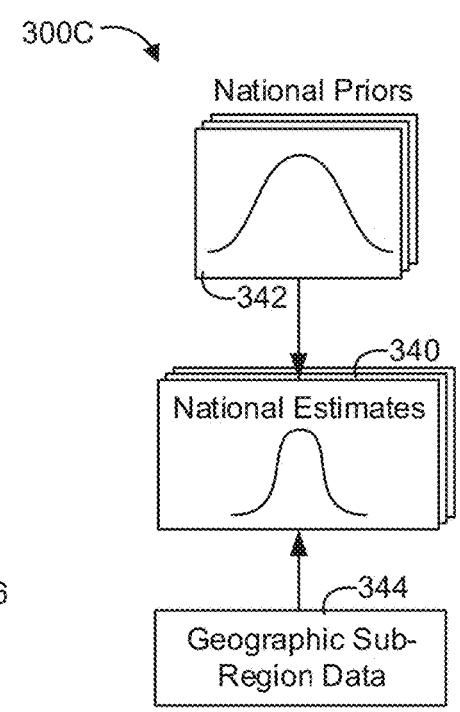
FIG. 3B
FIG. 3C

SYSTEMS AND METHODS FOR GENERATING A GEO-LEVEL HIERARCHICAL BAYESIAN MODEL

BACKGROUND

A Bayesian model is a model that is generated based on priors and gathered data. Specifically, the Bayesian model may include one or more parameters that are modeled with posterior distributions. The posteriors distributions may be based on prior distributions for the one or more parameters and data gathered for the one or more parameters. A prior is a probability distribution that models one of the parameters, it is a belief regarding a parameter before data is gathered for said parameter. Priors that are based on knowledge of what the parameter should be are referred to as informative or strong priors while priors that are not based on knowledge are referred to as non-informative or weak priors. Experiments (or otherwise data collection) can be performed for the various parameters. Based on the collected or experimental data and the priors, posteriors can be determined. A posterior may be a probability distribution that is based on both the prior and the collected data.

SUMMARY

In general, one innovative aspect of the subject matter described in this specification can be implemented in methods that include a method for generating a hierarchical Bayesian model. The method includes generating a plurality of geographic regions by grouping one or more geographic sub-regions into each of the plurality of geographic regions. The method includes generating a first geographic region by grouping a first set of the geographic sub-regions and generating a second geographic region by grouping a second set of the geographic sub-regions. The method includes receiving data for the geographic sub-regions, the data including responses, content inputs, content types, and location identifiers. In some embodiments, the data includes control variables and control variable types. The control variables and control variable types may indicate values for various factors which may affect response, for example, employment rate may be a type of control variable that affects response. The method further includes generating geo-level data from the received data by grouping the responses and content inputs of the received data based on a correlation of the location identifiers of the received data to the plurality of geographic regions. Further, the method includes fitting a Bayesian hierarchical model based on at least the geo-level data, the content types, and the geographic regions and determining a content input mix for the content types for each geographic region and/or at the national level based on the Bayesian hierarchical model and a content input constraint, the content input constraint indicating a total content input for each of the geographic regions and/or for a national level. The method may further include determining a return on ad spend for each of the content types. The method includes determining the content input mix for the content types for each geographic region by determining a first content input mix for the content types for the first geographic region and determining a second content input mix different than the first content input mix for the content types for the second geographic region In general, another aspect of the subject matter described in this specification can be found in a system with at least one computing device operably coupled to at least one memory. The computing device can be configured to generate a plurality of geographic regions by grouping one or more geographic sub-regions into each of the plurality of geographic regions. The computing device can be configured to generate the plurality of geographic regions by generating a first geographic region by grouping a first set of the geographic sub-regions and generating a second geographic region by grouping a second set of the geographic sub-regions. The computing device can be configured to receive data for the geographic sub-regions, the data including responses, content inputs, content types, location identifiers, control variables and/or control variable types. Further, the computing device can be configured to generate geo-level data from the received data by grouping the responses and content inputs of the received data based on a correlation of the location identifiers of the received data to the plurality of geographic regions. The computing device can be configured to fit a Bayesian hierarchical model based on at least the geo-level data, the content types, and the geographic regions and determine a content input mix for the content types for each geographic region based on the Bayesian hierarchical model and a content input constraint (e.g., the Bayesian hierarchical model given a content input constraint), the content input constraint indicating a total content input for each of the geographic regions. In some embodiments, the computing device can be configured to generate the Bayesian hierarchical model for all of the geographic regions together, i.e., at a national level. The computing device can be configured to determine the content input mix for the content types for each geographic region by determining a first content input mix for the content types for the first geographic region and determining a second content input mix different than the first content input mix for the content types for the second geographic region In general, another aspect of the subject matter described in this specification can be implemented in one or more computer-readable storage media having instructions stored thereon. When executed by at least one processor, cause the at least one processor to perform operations including generating a plurality of geographic regions by grouping one or more geographic sub-regions into each of the plurality of geographic regions. The operations include generating the plurality of geographic regions by generating a first geographic region by grouping a first set of the geographic sub-regions and generating a second geographic region by grouping a second set of the geographic sub-regions. The operations further include receiving data for the geographic sub-regions, the data including responses, content inputs, content types, and location identifiers. In some embodiments, the data includes control variables and control variable types. The operations include generating geo-level data from the received data by grouping the responses and content inputs of the received data based on a correlation of the location identifiers of the received data to the plurality of geographic regions. Further, the operations include fitting a Bayesian hierarchical model based on at least the geo-level data, the content types, and the geographic regions, fitting the Bayesian hierarchical model includes generating posteriors for one or more parameters of the Bayesian hierarchical model; and determining a content input mix for the content types for each geographic region (or in some embodiments for a national level, the geographic regions all together) based on the Bayesian hierarchical model given a content input constraint, the content input constraint indicating a total content input for each of the geographic regions. The operations include determining the content input mix for the content types for each geographic region by determining a first content input mix for the content types for the first geographic region and determining a second content input mix different than the first content input mix for the content types for the second geographic region.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 3B is a block diagram illustrating the GBHMMM of FIG. 3A according to an illustrative implementation.

FIG. 3C is a block diagram illustrating a national-level Bayesian Mixed Media Model (BMMM) that is not based on geographic regions according to an illustrative implementation.

DETAILED DESCRIPTION

Figure 1:
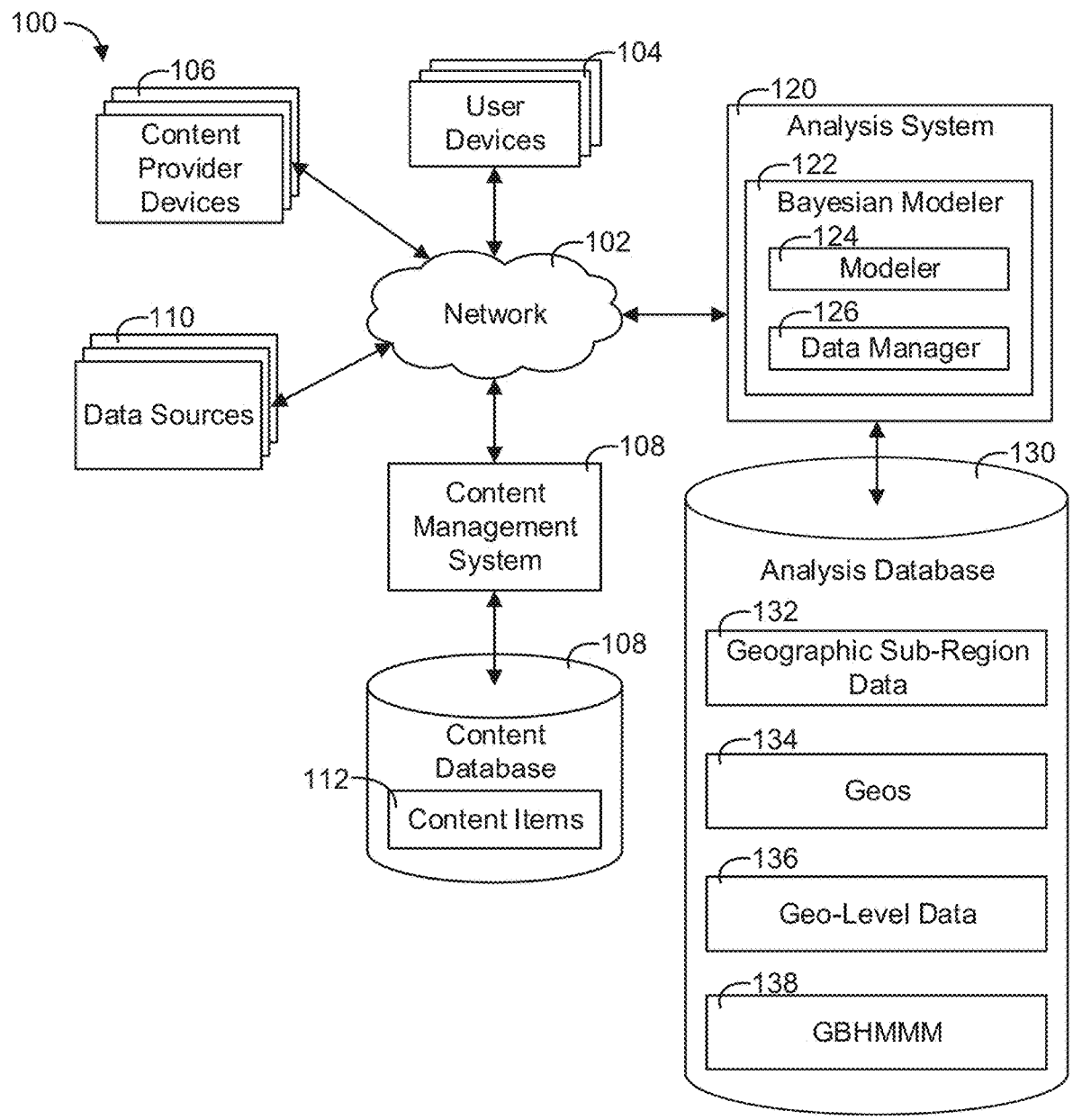
FIG. 1 is a block diagram of an analysis system including a Bayesian modeler and associated environment according to an illustrative implementation.

Referring generally to the Figures, various illustrative systems and methods are provided that can be used to generate a geo-level hierarchical Bayesian mixed media model (GBHMMM). A hierarchical Bayesian model may be a Bayesian model that has a hierarchy of model levels or "sub-models." Bayesian hierarchical models are used to generate posterior distributions for parameters of the model based on collected data for said parameters and a prior distribution for said parameters. In a hierarchical Bayesian model, the prior distribution may have its own parameters, often referred to as hyper-parameters. In this regard, the hyper-parameters themselves may be trained based on data and priors for said hyper-parameters, often referred to as a hyper-priors. Bayesian modelling can allow for prior information be used to inform the model and can model more complex models i.e., with informative priors. Bayesian hierarchical models can further provide more natural uncertainty statements and track both parameter and model uncertainties. Further, Bayesian modelling may allow propagation of uncertainty to optimization statements.

Media mix model (MMM) is an analytical approach that uses historical information, such as sales, marketing spend, price, macroeconomic variables, etc. to quantify the impact of various marketing activities on key performance indicators (KPIs, e.g., sales). Regression can be used to infer causation from observational data. Although the gold standard for making causal statements is randomized experiments, regression is popular because experiments in advertising face many hurdles. Advertisers are often unwilling to incur the technical and operational expense of running randomized experiments and a large number of experiments would be needed over sufficiently long time periods, to adequately capture ad shape and carryover effects. Historical media mix data is usually aggregated weekly or sometimes monthly for 2-5 years, providing the possibility to model the media impact over a longer period of time than experiments.

A Bayesian media mix model (BMMM) can be used with ad shape and carryover effects for a single brand aggregated at the national-level (referred to as a national-level BMMM herein). This model may suffer from small sample size and insufficient variation in media spend unless strong priors are used. One improvement to the model may be to pool data from one or more brands into the same product category and pass the knowledge via informative priors to a single brand within the same category.

Media mix modeling is a statistical analysis on historical data to measure the return on investment (ROI) on advertising and other marketing activities. As mentioned above, a BMMM that utilizes data aggregated at a national-level often suffers from small sample size and insufficient variation in the media spend. However, when sub-national data is available, a geo-level Bayesian hierarchical media mix model (GBHMMM) can be generated on said sub-national data. A GBHMMM can provide estimates with tighter credible intervals compared to a model with national-level data alone. This reduction in error is due to having more observations and useful variability in media spend, which can protect advertisers from unsound reallocation decisions. Under some weak conditions, the geo-level model can reduce advertisement targeting bias. When geo-level data is not available for all the media channels, the geo-level model estimates generally deteriorate as more media variables are imputed using the national-level data.

The country of focus in an MMM can usually be partitioned into a set of geographic areas which can be referred to herein as "geos." Data for building a MMM (i.e., a GBHMMM) can be gathered at the geo-level. The geo-level data has a larger effective sample size compared to the national-level data as long as the geo-level time series are not perfectly correlated with national-level values. Gathering data at a geo-level can enhance the data used to generate the Bayesian modeling, improving the performance of the Bayesian model. Also, it is common that an advertiser may never decrease their national-level media spend close to zero or always keep the spend of a media channel at a level too small compared to other channels. The marketing spend at the geo-level generally has a wider range than that at the national-level, which is critical to MMM as insufficient variation often leads to extrapolation issues. If it is assumed that the mechanism of media impact is similar across geos, the MMM can take advantage of this additional level of variation using a geo-level model (i.e., the GBHMMM).

Advertising bias can occur when the advertiser directs marketing efforts towards an underlying base demand. Hence, the media spend may be highly correlated with the base demand. When control variables do not perfectly capture the base demand, biases are introduced and media attribution may be incorrect. The GBHMMM can be simulated with the presence of advertising bias resulting from directed marketing efforts as discussed with reference to FIGS. 10-11. Another challenge to the GBHMMM is that the geo-level data may not be available for all media channels. The GBHMMM is tested with imputed data, the test and results are shown and discussed with reference to FIGS. 12-13. These simulations, as well as the various other simulations discussed herein, can be performed with the software environment R.

A Bayesian hierarchical model can be generated based on pooled information from multiple geographic regions and prior knowledge. The prior knowledge may be based on industry experience. The properties of geo-level data that can be used to generate a Bayesian hierarchical model, various variable transformations, and a geo-level Bayesian hierarchical model, and the systems and methods for generating the geo-level Bayesian hierarchical model are described in further detail with reference to FIGS. 1-2 and elsewhere herein. Comparisons between the national-level BMMM and GBHMMM are discussed through various simulations and the simulation results shown in FIGS. 5-9. The GBHMMM is generated on example real data i.e., the historical geo-level media mix data of advertisers in the auto category, which is further discussed with reference to FIGS. 14-17.

Media mix data can be aggregated at a national-level. This data aggregation at the national-level may suffer from small sample size and insufficient variation with a large amount of model parameters. A Bayesian hierarchical model can incorporate regional variations to enhance media mix modeling. Simulations and a real example from the auto category demonstrate that the geo level Bayesian hierarchical model (GBHMMM) helps reduce uncertainty of estimators compared to the BMMM using national-level data alone, and thus yields more accurate attribution results. As the target population size varies across geos, standardization of the variables to be the amount per capita can be performed for the GBHMMM. The improvement over the national-level BMMM is more pronounced when the level of media spend per capita varies significantly across geos. Although the geo-level model may not eliminate advertising bias, it can generally tighten the credible intervals of the estimators and sometimes lowers the bias.

Another common challenge is that regional level spend data is not always available for all media channels. Obtaining accurate geo-level data may be important for improving the performance of the GBHMMM. However, the imputed geo-level model can still generate useful information for the media channels with complete geo-level data. Hence it is better to build a geo-level model when the geo-level data is available, or partially available, as long as the geos have similar media impact mechanism.

The model specification discussed herein is one way to set up a geo-level model. Other functions to model shape and carryover effect can be used instead of the Hill and geometric adstock functions discussed herein. In some embodiments, the hierarchical structure of the GBHMMM may not be necessary for all the predictors. Bayesian model selection techniques such as Watanabe-Akaike Information Criterion (WAIC) can be employed to choose a model. The geo-level model can be extended to help correct advertising bias in MMM. Various simulation methods can be used to test the GBHMMM such as multi-stage simulation which may model a wider variety of marketing situations.

Referring now to FIG. 1, a block diagram of an analysis system 120 and associated environment 100 is shown according to an illustrative implementation. One or more user devices 104 may be used by a user to perform various actions and/or access various types of content, some of which may be provided over a network 102 (e.g., the Internet, LAN, WAN, etc.). A "user" or "entity" used herein may refer to an individual operating user devices 104, interacting with resources or content items via the user devices 104, etc. The user devices 104 may be used to access websites (e.g., using an internet browser), media files, and/or any other types of content. A content management system 108 may be configured to select content for display to users within resources (e.g., webpages, applications, etc.) and to provide content items to the user devices 104 over the network 102 for display within the resources. The content from which the content management system 108 selects items may be provided by one or more content providers via the network 102 using one or more content provider devices 106.

In some implementations, the content management system 108 may select content items from content providers to be displayed on the user devices 104. In such implementations, the content management system 108 may determine content to be published in one or more content interfaces of resources (e.g., webpages, applications, etc.). The content management system 108 can be configured to conduct a content auction among third-party content providers to determine which third-party content is to be provided to the user device 104. The auction winner can be determined based on bid amounts and a quality score (i.e., a measure of how likely the user of the user device 104 is to click on the content). In some implementations, the content management system 108 allows content providers to create content campaigns. A campaign can include any number of parameters, such as a minimum and maximum bid amount, a target bid amount, and/or one or more budget amounts (e.g., a daily budget, a weekly budget, a total budget, etc.).

The analysis system 120 can include one or more processors (e.g., any general purpose or special purpose processor), and can include and/or be operably coupled to one or more transitory and/or non-transitory storage mediums and/or memory devices (e.g., any computer-readable storage media, such as a magnetic storage, optical storage, flash storage, RAM, etc.). In various implementations, the analysis system 120 and the content management system 108 can be implemented as separate systems or integrated within a single system (e.g., the content management system 108 can be configured to incorporate some or all of the functions/capabilities of the analysis system 120).

The analysis system 120 can be communicably and operatively coupled to the analysis database 130. The analysis system 120 can be configured to query the analysis database 130 for information and store information in the analysis database 130. In various implementations, the analysis database 130 includes various transitory and/or non-transitory storage mediums. The storage mediums may include but are not limited to magnetic storage, optical storage, flash storage, RAM, etc. The database 130 and/or the analysis system 120 can use various APIs to perform database functions (i.e., managing data stored in the database 130). The APIs can be but are not limited to SQL, ODBC, JDBC, etc.

Analysis system 120 can be configured to communicate with any device or system shown in environment 100 via network 102. The analysis system 120 can be configured to receive information from the network 102. The information may include browsing histories, cookie logs, television advertising data, printed publication advertising data, radio advertising data, and/or online advertising activity data. The analysis system 120 can be configured to receive and/or collect the interactions that the user devices 104 have on the network 102. This information may be stored as geographic sub-region data 132.

Data sources 110 may be data collectors or content providers that can provide advertising data to the analysis system 120. The data may be content input (e.g., advertising spend) and response (e.g., revenue) for particular media channels (e.g., television, Internet advertising, radio, billboards, printed publications) at one or more points in time. The content input may include spending on television advertisements, billboard advertisements, Internet advertising (e.g., search ad spend or display ad spend), etc. Data sources 110 may be also be various data aggregating systems and/or entities that collect advertising data. The analysis system 120 can receive geographic sub-region data 132 from the data sources 110 via the network 102.

The analysis system 120 can be configured to send information and/or notifications relating to various metrics or models it determines, generates, or fits to the content provider devices 106. This may allow a user of one of the content provider devices 106 to review the various metrics or models which the analysis system 120 determines. Further, the analysis system 120 can use the various metrics to identify opportune times to make contact with a user or appropriate amounts (e.g., an optimal mixed media spend) to spend on various media channels (e.g., television advertising, Internet advertising, radio advertising, etc.). The analysis system 120 can cause a message to be sent to the content management system 108 and/or the content provider devices 106 indicating that the content management system 108 should make contact with a certain user at a certain time and/or a content campaign operate with certain parameters. This may cause the content management system 108 to manage content auctions accordingly and/or identify various system loads.

The analysis system 120 may include one or more modules (i.e., computer-readable instructions executable by a processor) and/or circuits (i.e., ASICs, Processor Memory combinations, logic circuits, etc.) configured to perform various functions of the analysis system 120. In some implementations, the modules may be or include a Bayesian modeler 122 which is shown to include a modeler 124 and a data manager 126.

The Bayesian modeler 122, i.e., the modeler 124 and the data manager 126, can be configured to generate the various models and data structures stored in the analysis database 130. For example, the data manager 126 can be configured to generate one or more geographic regions (geos) 134. The geos 134 may be data structures that indicate various geographic areas. For example, the geographic areas could be states, cities, countries, or any other geographic area. The geos 134 can be generated by the data manager 126 by grouping one or more smaller geographic regions, i.e., sub-regions, together. For example, the geos 134 could be generated by grouping multiple states into East coast, West coast, and Midwest. Further, multiple cities within a particular state could be grouped together to form a predefined number of the geos 134.

The data manager 126 can be configured to receive the geographic sub-region data 132 for each of the sub-regions that make up the geos 134. For example, for a particular state, the state may have five geos 134 that are each include five different cities. The data manager 126 can be configured to receive the geographic sub-region data 132 for each of the cities of each of the five geos 134. Based on a correlation between the geographic sub-regions, the geos 134, and an indication of location in the received data, the geographic sub-region data 132 can be sorted (grouped) into geo-level data 136 by the data manager 126. In some embodiments, the data manager 126 can be configured to receive data for the geos 134 as a whole instead data specific to particular sub-regions that make up the geos 134. The received data that the data manager 126 receives can be data that analysis system 120 aggregates and/or data that the analysis system 120 receives from the data sources 110.

The geographic sub-region data 132 may include sets of data that each include responses, content inputs, a content type, control variables, and/or a location identifier. The data may be for one or more points in time over an interval (e.g., data for each hour out of a day, data for each day out of a year, data for each month out of a decade, etc.) The content type may indicate a particular media channel of the set of data, for example, television, radio, Internet advertising, newspaper or magazine advertising, etc. The response may indicate particular amounts of revenue at particular times. In some embodiments, the response is number of conversions, number of sales, number of account registrations, etc. The content inputs may indicate particular amounts of advertising spending for the content type at particular times. The content inputs may further indicate a number of advertisements run. The geographic sub-region data 132 may be time series data structures indicating amounts of content input, response, for various media channels over time.

The modeler 124 can be configured to generate a geo-level Bayesian hierarchical mixed media model (GB-HMMM) 138 (e.g., Equations 11-14) based on the geo-level data 136 and one or more priors. The modeler 124 can be configured to fit the GBHMMM 138 based on the geo-level data 136 (which may include media channels (e.g., content types) and geos 134). The modeler 124 can be configured to fit the GBHMMM 138 to account for one or more media channels (e.g., content types) and geographic regions (e.g., the geos 134). Thus, the GBHMMM 138 may be a model that models content input and response for one or more content types in one or more goes 134. The modeler 124 can be configured fit the GBHMMM 138 by using various fitting algorithms (e.g., Markov Chain Monte Carlo (MCMC), Gibbs-Sampling, etc.) to generate one or more parameters for the GBHMMM 138. Generating parameters for the GBHMMM 138 may include generating one or more posteriors for the one or more parameters of the GBHMMM 138. Based on the GBHMMM 138, the modeler 124 can be configured to determine a content input mix for one or more content types. This may include performing an optimization with the GBHMMM 138 based on a spending constraint (e.g., a content input constraint). The modeler 124 can be configured to use the GBHMMM 138 and one or more constraints to identify an optimal mix of spending in one or more of the geos 134 and/or for a national level (e.g., the geos 134 as a whole). The spending constraint may be a constraint for each of multiple goes 134 or can be a spending constraint for all of the geos 134.

The GBHMMM 138 may include one or more functions that model carryover and lag effects of advertising. The carryover and lag effects can be understood as the relationship between content input, spending, and response, revenue. If spending is increased for a particular product, the response may not immediately increase, however, over time, the spending may increase. The effect which content input has on response may be delayed. Further, if content input is reduced, the response may not immediately be reduced. However, over time, the response may decrease, this is known as the lag effect of advertising. The GBHMMM 138 may include one or more functions that model the carryover and lag effects. In order to model carryover and lag, the GBHMMM 138 may include an adstock function (or a delayed adstock function). The GBHMMM 138 may include a Hill function to model saturation effects (e.g., the diminishing returns of ad spending). Both the adstock function and the Hill function are shown in further detail with reference to Equations 9 and 10.

Figure 2:
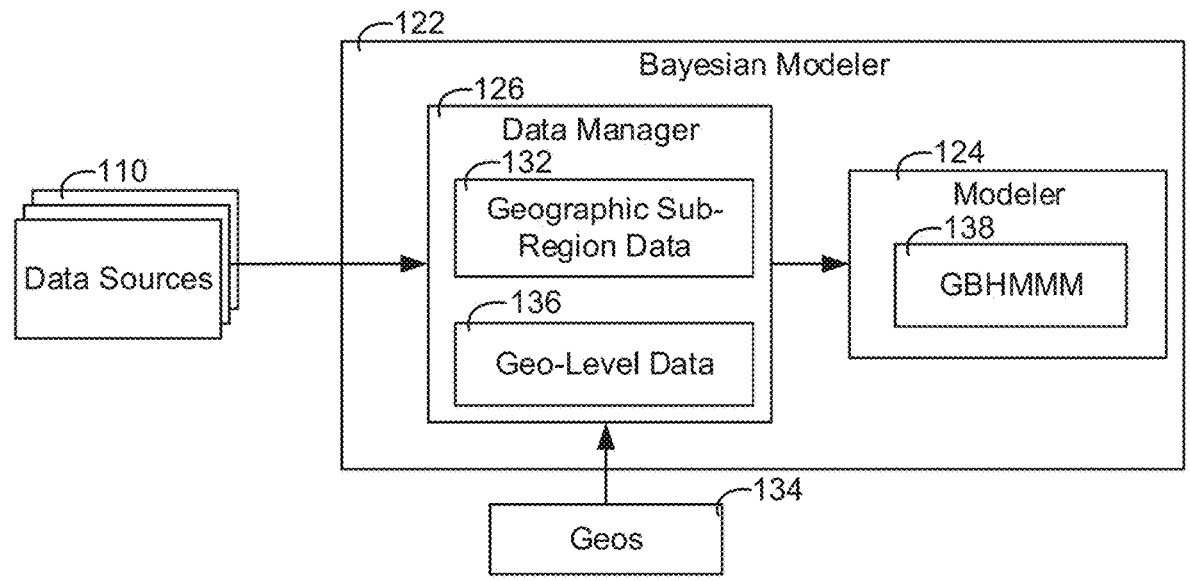
FIG. 2 is a block diagram of the Bayesian modeler of the analysis system of FIG. 1 shown in greater detail according to an illustrative implementation.

Referring now to FIG. 2, the Bayesian modeler 122 of the analysis system 120 of FIG. 1 is shown in greater detail according to an illustrative implementation. The Bayesian modeler 122 is shown to receive data from the data sources 110, however, the data may also be data that the analytics system 120 generates or collects itself. This received data may be the geographic sub-region data 132. The data may be advertising data, i.e., content input and response, for one or more media channels for one or more points in time. Further, the data may be a control variable e.g., employment rate for a particular geo 134. The data may further indicate a location of the content input and/or response, this may allow the data to be associated (correlated) with one of the geos 134. The data manager 126 can be configured to generate the geo-level data 136.

Based on the geo-level data 136, the modeler 124 can be configured to generate the GBHMMM 138. The GBHMMM may be a hierarchical Bayesian model that models content input and response for each of the geos 134 for one or more media channels, i.e., it is a mixed media model that models one or more geographic regions. The GBHMMM 138 may include one or more parameters. The modeler 124 can be configured to use the geo-level data 136 and one or more models for the parameters to fit the parameters of the GBHMMM 138. Fitting the parameters of the GBHMMM 138 can include generating a posterior distribution for each of the parameters of the GBHMMM 138 by the modeler 124 based on the geo-level data 136 and the one or more priors.

In some embodiments, the GBHMMM 138 is generated by modeler 124 based on standardized data. For example, the data manager 126 can be configured to standardize the geo-level data 136 so that the GBHMMM 138 is generated based on standardized data. The geo-level data 136 can be standardized based on the population of each of geos 134 (or an approximation of the population of each of geos 134). For this reason, the response and content input can be scaled for each of goes 134 based on the population of each of the geos 134. In this regard, the data manager 126 can be configured to receive and/or determine the population of each of the geos 134. In some embodiments, the data manager 126 stores the population of each sub-region used to generate the geos 134. In this regard, in response to determining the geos 134, the modeler 124 can be configured to determine the population of each of the geos 134 based on the sub-regions that make up the geos 134. The methods used to standardize the data can be seen in Equations 1-6 and elsewhere herein.

The GBHMMM 138 can be fit based on one or more control variables. The control variables may be time series data that changes over time. The control variables may be different types and include average income for geos 134, employment rates for goes 134, and/or any other metric that may influence sales but are not content input (e.g., advertising spend). These control variables may indicate various conditions of each of the geos 134. Some examples of control variables may be average income of the geos 134, employment percentage of the geo 134, average number of homeowners of the geo 134, and/or any other control variable. The control variables can be standardized with the same methods used to standardize the geo-level data 136 and is described in Equations 1-6 and elsewhere herein.

Figure 3A:
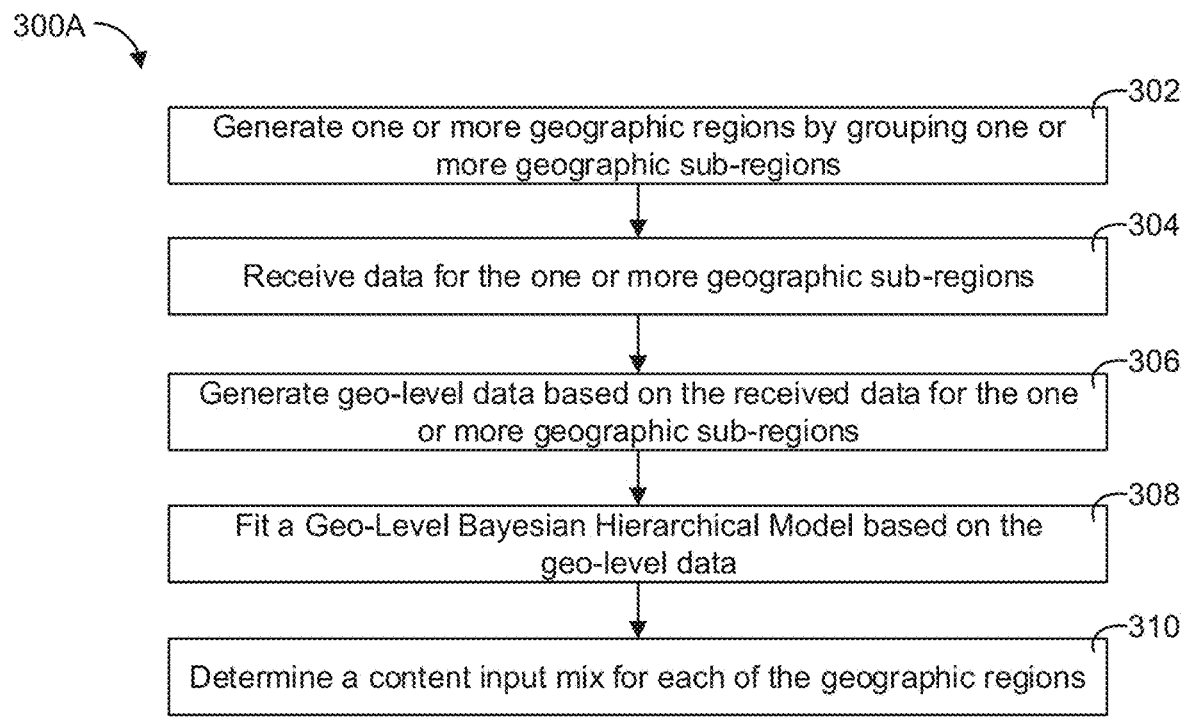
FIG. 3A is a flow chart of a process for generating a Geo-Level Bayesian Hierarchical Media Mixed Model (GBHMMM) by the Bayesian modeler of FIG. 2 according to an illustrative implementation.

Referring now to FIG. 3A, a process 300A is shown that can be performed with the Bayesian modeler 122 to generate the GBHMMM 138 according to an illustrative implementation. In step 302 of the process 300A, the data manager 126 can be configured to generate one or more geographic regions (e.g., the geos 134) by grouping one or more geographic sub-regions. In some embodiments, the geographic sub-regions are particular counties of a state, particular cities of a state, particular states, and/or particular countries. In some embodiments, the grouping is performed based on user input e.g., input received from the content provider devices 106 as described with reference to FIG. 1.

In some embodiments, one or more cities in a particular geographic area can be grouped together to form a single geographic region i.e., one of geos 134. Further, multiple states can be grouped together to form one of geos 134 for example, Washington, Oregon, and California could be grouped together to form a "West Coast" geo 134 while New York, Pennsylvania, and Virginia could be grouped together to form an "East Coast" geo 134. In some embodiments, the data manager 126 can be configured to identify a particular sub-region as a geo 134. For example, New York may be a sub-region that can be set to be a particular geo 134 while Pennsylvania may be another sub-region could be set to be another geo 134.

In step 304, the Bayesian modeler 122 can be configured receive data for the one or more sub-regions used to generate the geos 134 in step 302. Specifically, the data manager 126 can be configured to receive the data from data sources 110. The data may indicate content types (e.g., the particular media channel i.e., Internet advertising, television advertising, radio advertising), content inputs (e.g., an amount of spend in a particular media channel), responses (e.g., an amount of revenue or sales, Internet conversions, number of website visits), and/or locations (e.g., geographic coordinate, district indication, city indication, state indication, country indication) at one or more points in time. In some embodiments, the Bayesian modeler 122 can be configured to receive data for a particular geo 134 instead of data for particular geographic sub-regions.

The content types may include radio advertising channels, Internet advertising channels, television advertising channels, billboard advertising channels, etc. The content inputs may indicate a particular amount spent on a particular media channel at one or more points in time. For example, the content inputs could indicate the amount of money that was spent each day for a month on Internet search advertisements. The response may indicate an amount of revenue. For example, the amount of revenue for each day for the same month can be indicated by the response. The content inputs and/or responses may indicate monthly spend and revenue. In some embodiments, content inputs may indicate the amount of money that was spent each month for one or more years. The response may indicate the amount of revenue for each month for the one or more years.

In step 306, the data manager 126 can be configured to sort the received data of step 304 into the geo-level data 136. The data manager 126 can be configured to sort the data based on a location identifier in the geographic sub-region data 132 and a correlation of the location with the geos 134. For example, if Chicago is a sub-region in a larger geographic region Illinois, the data manager 126 can identify, data for Chicago as being data for the geo Illinois based on a correlation between Chicago and Illinois, i.e., Chicago may be set to be part of a large geo Illinois. In this regard, based on a location identifier included in the received data, the received data can be properly sorted based on the geos 134.

In step 308, based on the geo-level data 136, the modeler 124 can be configured to fit (generate) the GBHMMM 138. Fitting the GBHMMM 138 may include generating one or more parameters for the GBHMMM 138, specifically, generating posterior distributions for each of the one or more parameters. Generating the GBHMMM 138 may include generating the GBHMMM 138 based on one or more priors for one or more parameters of the GBHMMM 138 and the geo-level data 136. Modeler 124 can be configured to receive informative and/or non-informative priors (e.g., weak or strong priors). The priors may be distributions for one or more parameters of the GBHMMM 138. An informative prior (e.g., a strong prior) may be a predetermined probability distribution for a parameter.

For example, past experiments or industry knowledge may define the distribution for a particular parameter. For example, there may be a known behavior of how television advertising behaves, thus an informative prior can be received and/or selected by the modeler 124 based on this knowledge. An informative prior may be a probability distribution with most of the probability distributed across particular values. A non-informative prior (e.g., a weak prior) may be a probability distribution having a large uncertainty. A non-informative prior may be used by received and/or selected by the modeler 124 when there is not a predetermined notion of what ideal value for a parameter.

Fitting the GBHMMM 138 may include fitting the posterior of each of the one or more parameters based on the geo-level data 136, i.e., posterior of each of the one or more parameters may be the prior for each of the one or more parameters conditioned on the geo-level data 136. Since the GBHMMM 138 is hierarchical, the GBHMMM 138 may include one or more hyper-parameters. The hyper-parameters may be parameters of prior distributions for the one or more parameters for the GBHMMM 138. The hyper-parameters may be based on their own priors, i.e., hyper-priors. When fitting the GBHMMM 138, the hyper-priors and posteriors for the hyper-parameters of the priors of the parameters of the GBHMMM 138 can be fit by the modeler 124.

Using one or more fitting algorithms (e.g., Gibbs-Sampling, Markov Chain Monte Carlo (MCMC), etc.) the modeler 124 can be configured to generate the GBHMMM 138. Generating the GBHMMM 138 may include determining posterior distributions for the one or more parameters of the GBHMMM 138. Thus, both the geo-level data 136 and priors for the parameters may influence the generation of the posterior distribution for the GBHMMM 138. Based on the GBHMMM 138 generated in step 308, the modeler 124 can be configured to generate a content input mix for each of the geos 134 (for a single geo 134 or for a national level, the geos 134 as a whole) (step 310). The modeler 124 can be configured to determine a return on ad spend for each media channel (content type). The content input mix may be an optimal allocation of advertising spending for each of the geos 134. The content input mix may indicate an optimal allocation of advertising spend across multiple media channels for each of the geos 134, one of the geos 134, or for all of the geos 134 together. In some embodiments, the modeler 124 receives a constraint (e.g., an optimization constraint) from the one of the content provider devices 106. The constraint may indicate a particular amount of money to spend on advertising in each of the geos 134. In this regard, the modeler 124 can be configured to use the constraint and the GBHMMM 138 to determine a spending mix (i.e., content input mix). In various embodiments, the constraint indicates a total amount of advertising spend for all of the geos 134 collectively. In this regard, the modeler 124 can be configured to generate a content mix for each of the geos 134 based on a single constraint.

In some embodiments, in step 302, generating the geographic regions includes generating a first geographic region and a second geographic region. As an example, a first geographic region can be a state, e.g., Wisconsin, and the second geographic region can be a another state, Illinois. Generating the first and second geographic regions may include grouping a first set of geographic sub-regions together into the first geographic region and a second set of geographic sub-regions into the second geographic region, based on a geographic correlation of the sub-regions and the geographic region. For example, Chicago and Springfield together. The second geographic region can be generated in a similar manner. Cities and states are exemplary and any type of geographic region can be used as the geographic regions and the geographic sub-regions. The GBHMMM 138 can be based on the first and the second geographic regions, in fact, the GBHMMM 138 can be based on any number of geographic regions. In step 310, the GBHMMM 138 can be used to determine a content input mix for each of the geographic regions. For example, for Wisconsin, the GBHMMM 138 can determine a content input mix for Wisconsin, this may be an optimal spending mix on one or more content input types, e.g., amounts to spend on television advertising, Internet advertising, etc. A second content input mix can be determined for the second geographic region, Illinois.

Referring now to FIG. 3B, a block diagram 300B illustrating the GBHMMM 138 is shown according to an illustrative implementation. As can be seen, the geo-level data 136 includes data for three different geos, i.e., geo 1 data 328, geo 2 data 330, and geo 3 data 332. Further, the data for said geographic regions, i.e., content input, response, control variable, etc., for one or more points in time for one or more media channels is grouped based on geographic region. The geo-level data 136 can be generated by the data manager 126 as described in step 302 of process 300A.

Based on the geo-level data 136 and one or more priors, i.e., geo 1 priors 320, geo 2 priors 322, and geo 3 priors 324, the GBHMMM 138 can be generated by modeler 124. The priors 320-324 may be informative, i.e., they may be predetermined by a user based on industry knowledge or information learned from other data sources. The priors 320-324 may be probability distributions for parameters of the GBHMMM 138. Based on the priors and the geo-level data 136, posteriors for the parameters of the GBHMMM 138 can be generated. The GBHMMM 138 may indicate a hierarchical estimate 326. The hierarchical estimates 326 may be an estimate for parameters of the GBHMMM 138. The hierarchical estimates 326 may be posteriors of the parameters of the GBHMMM 138. The posteriors may be probability distributions generated based on the priors 320-324 and the geo-level data 136.

Referring now to FIG. 3C, a national-level Bayesian mixed media model (BMMM) is shown. The national-level BMMM can be generated by the modeler 124 described with further detail in FIG. 2. The national-level BMMM can be generated by the modeler 124 based on national priors 342 and the geographic sub-region data 344. The national priors 342 may be probability distributions for parameters of the national-level model. Since the national-level model is not geo based, the priors are not specific to parameters for particular geos but and thus are referred to as national priors. National estimates 340 are shown in FIG. 3C. The national estimates 340 may be posterior distributions for parameters of the national-level Bayesian model.

Figure 3D:
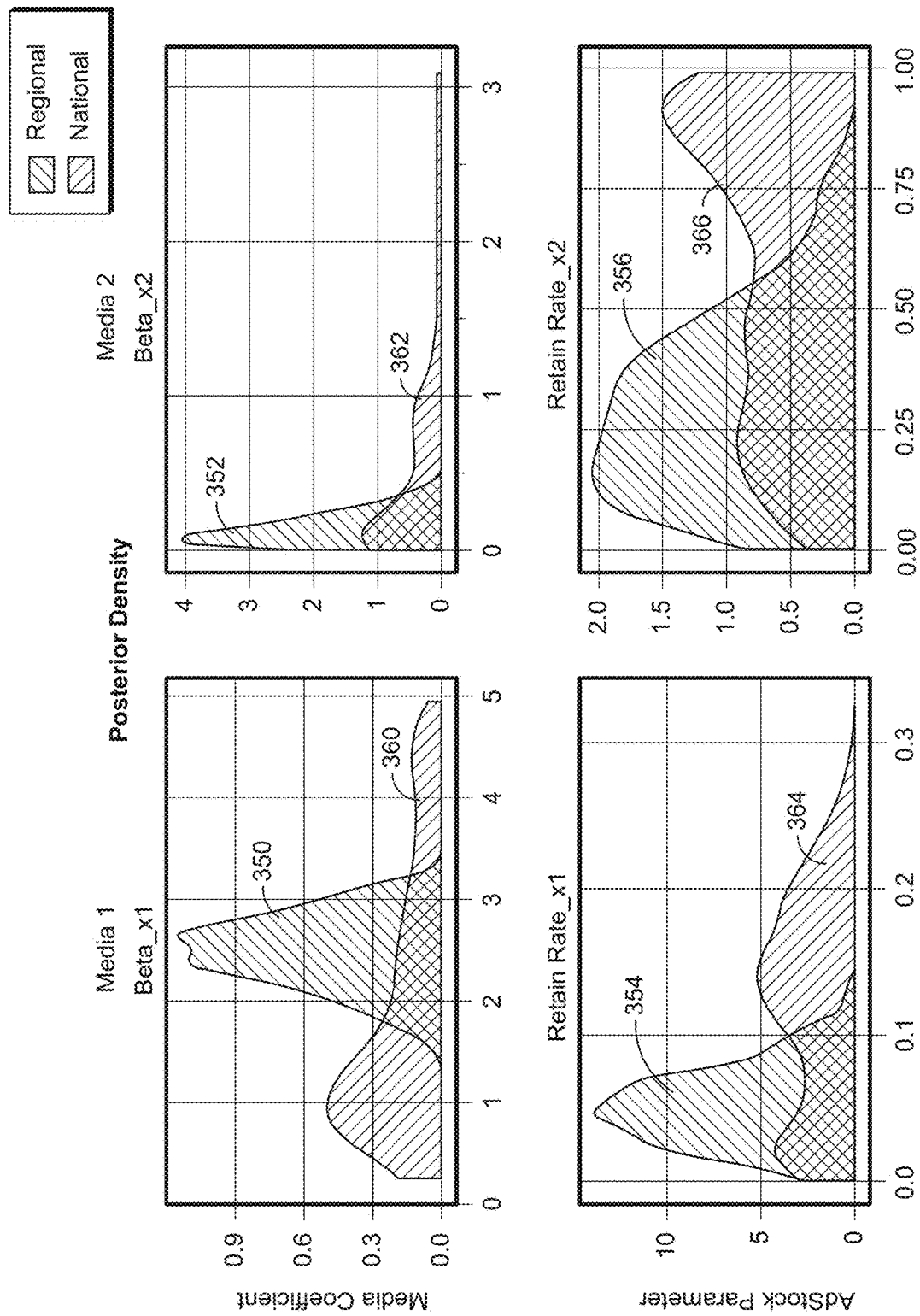
FIG. 3D is a set of charts illustrating posterior densities of the GBHMMM of FIG. 3B and the national-level BMMM of FIG. 3C according to an illustrative implementation.

Referring now to FIG. 3D, charts illustrating a comparison of posterior densities for the GBHMMM 138 as illustrated by in FIG. 3B and the national-level BMMM illustrated in FIG. 3C are shown. In FIG. 3D, four separate parameters are shown. The parameters are two media coefficients for both the GBHMMM 138 and the national-level model. The other two parameters are adstock parameters. The posterior densities of the parameters for the GBHMMM 138 are illustrated by posterior densities 350, 352, 354, and 356. The posterior densities for the national-level model are 360, 362, 364, and 366. As can be seen in FIG. 3D, the posteriors for the GBHMMM 138 have less uncertainty than the posteriors of the national-level Bayesian model.

Visually, posteriors with less uncertainty can be understood as "taller" i.e., the majority of the probability of the posterior lies within a smaller range of values (e.g., refer to posterior 350). In comparison, posteriors with more uncertainty can be understood as "wider" i.e., the probability of the posterior is spread out across values (e.g., refer to posterior 360). Posteriors which have less uncertainty are desired for models as opposed to posteriors with greater uncertainty. For this reason, it can be seen that the GHBMMM 138 has better posteriors than a national level model, even though the GBHMMM 138 was trained on the same data as the national level. One reason for the improvement is the specific steps of data manipulation that can be used to generate the geo-level data 136 from the geographic sub-region data 344 i.e., steps 302-308.

Referring to FIGS. 3B-3C generally, the modelling improvements of the GBHMMM 138 over the national-level BMMM can be seen. As is illustrated in FIGS. 3B and 3C, both models use the same national data set. However, the GBHMMM 138 breaks the national data set down based on geographic regions to generate the geo-level data 136. Leaving the national data as is, i.e., not breaking the data down by geographic region, is the geographic sub-region data 344. Based on the geo-level data 136 and its specific structure, the GBHMMM 138 can be generated to be a significantly stronger model than the national level model. Specifically, the posteriors 350-356 are shown to have less uncertainty than the posteriors 360-366 of the national level model. Having posteriors with less uncertainty indicates that the model is more accurate in its predictions.

As can be seen with the comparison of the GBHMMM 138 and the national-level BMMM which are trained on the same data set, particular treatments to the data set can lead to an improved model without increasing the number of samples of the data set but leveraging the granularity of the data. Variation in data is important for the performance of a model, through the steps of process 300A, data can be treated such that variations in data across geos can be exposed and leveraged to improve the performance of a model built on said data. The steps of exposing and leveraging data variation between geos can lead to stronger priors as shown in FIG. 3D. Specifically, the steps for generating geos 134 (i.e., step 302) and using the geos to generate the geo-level data 136 (i.e., steps 302-306) of process 300A can lead to a data set i.e., the geo level data 136 that can leverage the variations in content input and response across the geos 134 to generate an improved model, the GBHMMM 138.

Referring again to FIGS. 1, 2, and 3, the systems and methods for generating the GBHMMM 138 are shown. The Bayesian modeler 122 can be configured to perform the various methods described herein. Specifically, the data manager 126 can be configured to perform the various data collection, data sorting, and data manipulation steps described. Further, the modeler 124 of the Bayesian modeler 122 can be configured to perform the various model fitting steps described herein. Generating, the GBHMMM 138 begins with the identification of the geos 134. It may be necessary to serve advertisements according to these geographic regions with reasonable accuracy and to track advertising spend and the response metrics at the geographic-level. One possible set of geos 134 is cities. Cities are often adopted as a geo-targeting unit by many advertising platforms. It may be useful to aggregate cities (e.g., geographic sub-regions) into larger geos for two reasons. One reasons may be that data at the city level can be sparse and noisy for small cities. Second, consumers could see an advertisement in one city but travel across city boundaries to another city to make a purchase, in which case the wrong city will get credit for the sale in the model, leading to inaccurate attribution.

Advertisers generally track key predictor indicators (KPIs) at a very granular level and it is relatively straightforward to aggregate the KPIs to geos. It is easier to obtain geo-level advertisement spend data for certain types of media than others. Spot television advertising is by definition aggregated at specific geographic areas where the television advertisements are placed. National television ad spend in each geo can be estimated by data manager 126 from television Gross Rating Points data at the geo-level and is available from comScore Inc. Price and promotion are sometimes available at the geo-level. Data sources 110 may include Information Resources, Inc (IRI), Consumer Packaged Goods (CPG), and/or R.L. Polk & Company. Information Resources, Inc (IRI) may provide price and promotion data for consumer packaged goods (CPG) brands at the geo level and R.L. Polk & Company provides such data for auto brands. Digital advertising publishers generally have the capability to break down media exposure and spend by geo.

It may not always be possible to get data from an exhaustive set of geos 134 that cover the entire business region. In that case, the sum of media spend or sales across the geos 134 would not be equal to the national-level sums. The GBHMMM 138 is useful in such a case. This may be because the available geos may represent the majority of sales and ad spend.

The geo-level variability in the data may help the geo-level model to outperform a national-level BMMM. In many ad platforms, geo-targeting techniques make it possible to vary ad spend across geo locations. Geo experiments are often used to measure the ad effectiveness by modifying the media spend in randomly picked treatment geos and estimating the response relative to the control geos. Independent variation in marketing spend across geos from the experiments offers the possibility to improve MMM results by eliminating or reducing advertisement bias, that occurs from the result of directed marketing efforts, and increasing the effective sample size. It may also be less expensive for advertisers to change marketing spend in a few selected geos than nationally.

Both the response and predictor variables (e.g., response and content input) can be normalized by the target population size of a geo in order to build a model with similar media impact across geos. While control variables such as temperature, unemployment rate, etc. are independent of the target population size in each geo, KPI and marketing spend are generally positively correlated with it. In addition, a certain amount of media spend may reach the saturation point in one city but not in another city, since the cities differ in the target population size. Hence in order to build a model with shared advertising shape effect, media spend can be standardized to the amount per capita. In some use cases, the census population size may be one proxy for the target population. However, for an auto advertiser, sales may be a better proxy for the target population than the population size because a wealthy smaller town might have a larger target market for luxury car brands than a poor bigger town. The better that for such issues can be controlled, the more better the assumption of similar media impact mechanism across geos becomes.

For one of the geos 134, i.e., g=1, . . . , G, at time t, t=1, . . . , T, we observe the geo-level response variable $Y_{t,g}$, media variables $X_{t,m,g}$ in the media channel m=1, . . . , M and control variables $Z_{t,c,g}$, c=1, . . . , C. This data may be the geographic sub-region data and/or the geo-level data 136. The response variable may be a KPI (e.g. revenue, online inquiries, etc.). The media variables could be advertising spend or number of impressions delivered. Using media spend or exposure for modeling depends on the assumptions modelers want to make and the data available. The control variables can include product price, promotions, and macroeconomic factors, such as unemployment rate, gasoline price, etc. The number of geos 134, g, may be in the tens and the number of time periods T may be in the hundreds depending on the aggregation level of the data.

Letting the target population size for one geo 134, g, be $s_g$. It may vary across the geos 134 but can be assumed to be the same across time during the observation period. The variables $\Omega_x$ and $\Omega_z$ can be the set of indices for media variables and control variables that are subject to the target population size and $\Omega_x^c$ and $\Omega_z^c$ can be their complements. The former variables to be the amount per capita using $s_g$. The standardized variables that can be obtained by the data manager 126 may be as follows (Equations 1-6), $y_{t,g}=Y_{t,g}/s_g$ $x_{t,m,g}=X_{t,m,g}/s_g, m \in \Omega_x$;

$z_{t,m,g}=X_{t,m,g}, m \in \Omega_x^c$ $z_{t,c,g}=Z_{t,c,g}/s_g, c \in \Omega_z$;

$z_{t,c,g}=Z_{t,c,g}, c \in \Omega_z^c$ for g=1, . . . , G, t=1, . . . , T.

The data manager 126 can be configured to further transform the response variables by a function $F_y(\cdot)$, for example, $F_y(v)=\log(v+1)$, although this can be applied on a case-by-case basis since it implies a multiplicative relationship between variables. The ranges of media variables could vary significantly across channels. In order to reduce the search space of parameters and employ common priors across media channels, the data manager 126 can be configured to normalize $x_{t,m,g}$ to be between zero and one for each of the M media channels. Standardization of variables is described with further detail herein.

Advertising may exhibit a lag or carryover effect, i.e., a delayed response can occur in subsequent time periods of advertising. Several functional forms, such as geometric adstock, polynomial distributed lags (PDL), and delayed adstock, can be used to model the carryover effect. Further, advertising can have diminishing returns at high level of spend, referred to as shape effect. Non-linear transformation of media variables are often used to model the curvature of the response, including the logarithmic transformation, Hill function, and logistic growth function.

The carryover and shape effect of advertising can be modeled through the (normalized) adstock function and the Hill function. The adstock function can be defined as (Equation 7), $$\text{adstock}(x_{t-L+1}, \ldots, x_t; w, L) = \frac{\sum_{l=0}^{L-1} w(l) x_{t-l}}{\sum_{l=0}^{L-1} w(l)},$$

where $\{x_t, t \geq 1\}$ is a media spend time series and $w(l)$, for $l \in \{0, \ldots L-1\}$ is a nonnegative weight function.

The integer L is the maximum duration of carry effect. A commonly used weight function takes the form of geometric decay (Equation 8), $w^g(l;\alpha)=\alpha^l$, for $l \in \{0, \ldots, L-1\}$, where $\alpha \in (0,1)$ is the retention rate of ad effect of the media.

This function assumes that the ad effect peaks at the same time period as the advertisement exposure, which might not be the case for media channels taking longer to build up effect. To model the delayed peak effect, the delayed adstock function as can be used which is expressed as (Equation 9), $$w^d(l;\alpha,\theta) = \alpha^{(l-\theta)^2}, \text{ for } l \in \{0, \ldots, L-1\},$$

where $\theta \in [0, L-1]$ is the delay of the peak effect and $\alpha \in (0,1)$ is the retention rate.

To simplify the notation, $x_t^*(\alpha, L) = \text{adstock}(x_{t-L+1}, \ldots, x_t; w^g, L)$ can be denoted as the geometric ad-stock transformed media spend and $x_t^*(\alpha, \theta, L) = \text{adstock}(x_{t-L+1}, \ldots, x_t; w^d, L)$ can be denoted as the delayed adstock transformed media spend. For simplicity of illustration, we will use geometric adstock $x_t^*(\alpha, L)$ in the model specification hereafter. Other adstock functions can be used in a similar fashion.

The Hill function can be applied after the adstock transformation. The Hill function is defined as (Equation 10), $$\text{Hill}(x; K, s) = \frac{1}{1 + (x/K)^{-s}},$$

where $S>0$, $K>0$ and x is the adstock transformed media spend. K can be referred to as $EC_{50}$, the half saturation point as Hill(K; K, S)=½ for any value of K and S. The Hill function goes to 1 as the media spend goes to infinity. The corresponding response curve is defined as $\beta$Hill(x; K, S) where $\beta$ is the maximum ad effect achievable. If the true K is far outside the range of observed historical media spend, the parameters K, S, $\beta$ are essentially unidentifiable. The range of geo-level media spend may generally be wider than that at the national-level and thus makes the estimation of these parameters more feasible.

The GBHMMM 138 can be a Bayesian hierarchical model with non-linear transformation on some of the predictors. The hierarchical linear model or mixed effect model may assume that the data is drawn from a hierarchy of subpopulations with repeated measurements on each. Such a model can control for unobserved heterogeneity across subpopulations with random coefficients. The random coefficient can have a different value for each subpopulation. It can be assumed for simplicity that there is no synergy effect between media, which may not be true in practice. The geo-level response (e.g., the response of the GBHMMM 138) can be modeled as shown in (Equations 11-14), $$y_{t,g} = \tau_g + \sum_{m=1}^{M} \beta_{m,g} \text{Hill}(x_{t,m,g}^*(\alpha_m, L); K_m, S_m) + \sum_{c=1}^{C} \gamma_{c,g} z_{t,c,g} + \epsilon_{t,g},$$

$$\beta_{m,g}^{iid} \sim \text{normal}(\beta_m, \eta_m^2), m = 1, \ldots, M,$$

$$\gamma_{c,g}^{iid} \sim \text{normal}(\gamma_c, \xi_c^2), c = 1, \ldots, C$$

$$\tau_g^{iid} \sim \text{normal}(\tau, \kappa^2), \epsilon_{t,g}^{iid} \sim \text{normal}(0, \sigma^2),$$

where each geo is a sample from the overall population and is allowed to deviate from the population level mechanism through the random effects $\tau_g$, $\beta_g = (\beta_{1,g}, \ldots, \beta_{M,g})$ and $\gamma_g = (\gamma_{c,1}, \ldots, \gamma_{C,g})$, g=1, ..., G. The geo-level variation is controlled by the standard deviations $\kappa, \eta = (\eta_1, \ldots, \eta_M)$ and $\xi = (\xi_1, \ldots, \xi_C)$, respectively. The parameters $\tau$, $\beta = (\beta_1, \ldots, \beta_M)$, $\gamma = (\gamma_1, \ldots, \gamma_C)$ are hyper-parameters, representing the common mechanism of media impact at the total population level. Priors (e.g., hyper-priors) are needed for the hyper-parameters $\tau, \beta, \gamma$ and standard deviations $\kappa, \eta, \xi$.

Furthermore, non-linear transformation can applied on media variables to capture carryover and shape effects and $\alpha = (\alpha_1, \ldots, \alpha_M)$, $K = (K_1, \ldots, K_M)$ and $S = (S_1, \ldots, S_M)$ are the corresponding transformation parameters. These parameters can be restricted to be the same across geos but can be allowed to vary across media. While these parameters could be allowed to vary across the geos 134, this can raise identifiability problems. Priors for parameters associated with the carryover and shape effects, such as $\alpha$, K, S may be needed. In some embodiments, the maximum duration of carryover effect L is fixed to be the same for all the media channels. L may be predetermined by users and not estimated in the GBHMMM 138, although it would be possible to allow L to be a parameter estimated in the model as well.

The priors may be set to default priors. Alternatively, category level priors can be used as informative priors for the GBHMMM 138. If the data is strong enough, the posterior will be pulled towards the true parameters, otherwise, the posteriors will be close to the priors. If non-negativity is desired for $\beta$, a gamma prior or a half-positive normal prior can be put on $\beta$. Using an improper prior uniform $(0, \infty)$ on scale parameters $\sigma, \kappa, \eta, \xi$ can lead to slow convergence. The scale parameters may be unlikely to exceed a low range, especially when modeling the response variable on the log scale. It may be necessary to have a bounded prior or a prior with much of its probability mass near zero, for example, half normal distribution.

The modeler 124 can use a variety of methods to generate (fit) the GBHMMM 138. The methods may include Markov Chain Monte Carlo (MCMC). MCMC can be used to fit the GBHMMM 138. STAN®, which uses Hamiltonian Monte Carlo, offers a general implementation to fit Bayesian models. Customized algorithms, which take advantage of the specific model form of the GBHMMM 138, can also be developed to fit such models and be faster than STAN®. In particular, the GBHMMM 138 may be a hierarchical linear model when conditioning on the transformation parameters. Gibbs sampling can be used to fit the geo-level model by alternating between sampling the transformation parameters and the hierarchical linear model parameters. When conditioning on the parameters of the hierarchical linear model, slice sampling can be used to draw samples from the full conditional distribution of the transformation parameters. When conditioning on the transformation parameters, Gibbs sampling can be used to draw samples for parameters associated with the hierarchical linear model.

The hierarchical structure of the GBHMMM 138 may not be needed for all predictors. For example, some of the media coefficients and/or the control coefficients could be the same across the geos 134, i.e., $\beta_{m,1} = \ldots = \beta_{m,G} = \beta_m$ for some m ∈ {1, ..., M} and/or $\gamma_{c,1} = \ldots = \gamma_{c,G} = \gamma_c$ for some c ∈ {1, ..., C}, while the intercepts may be allowed to vary across geos. Such models have much fewer parameters to estimate than a full GBHMMM. To tell whether hierarchical structures are needed, the Watanabe-Akaike information criterion and cross-validation to estimate pointwise out-of-sample prediction accuracy from the Bayesian models can be used. The model with higher out-of-sample prediction accuracy can be selected.

Another embodiment of the GBHMMM 138 is a brand based Bayesian hierarchical model. The geo-level model of a single brand can be extended to multiple brands within a product category, and this extension of the GBHMMM 138 may be referred to as a category-geo-level model. The response of brand b at geo g and time t is modeled as follows in Equations 15-19), $$y_{t,g,b} =$$

$$\tau_{g,b} + \sum_{m=1}^{M} \beta_{m,g,b} \text{Hill}(x^*_{t,m,g,b}(\alpha_m, L); K_m, S_m) + \sum_{c=1}^{C} \gamma_{c,g,b} z_{t,c,g,b} + \epsilon_{t,g,b},$$

$$\beta_{m,g,b}^{iid} \sim \text{normal}(\beta_m, \eta_m^2), m = 1, \ldots, M,$$

$$\gamma_{c,g,b}^{iid} \sim \text{normal}(\gamma_c, \xi_c^2), c = 1, \ldots, C$$

$$\tau_{g,b}^{iid} \sim \text{normal}(\tau, \kappa^2), \epsilon_{t,g,b}^{iid} \sim \text{normal}(0, \sigma^2),$$

for $b = 1, \cdots, B$, $g = 1, \cdots, G$, $t = 1, \cdots, T$.

The model may assume shared carryover and shape effects across geos and brands, while random intercepts and coefficients can be used to account for geo and brand level variation.

Figure 4:
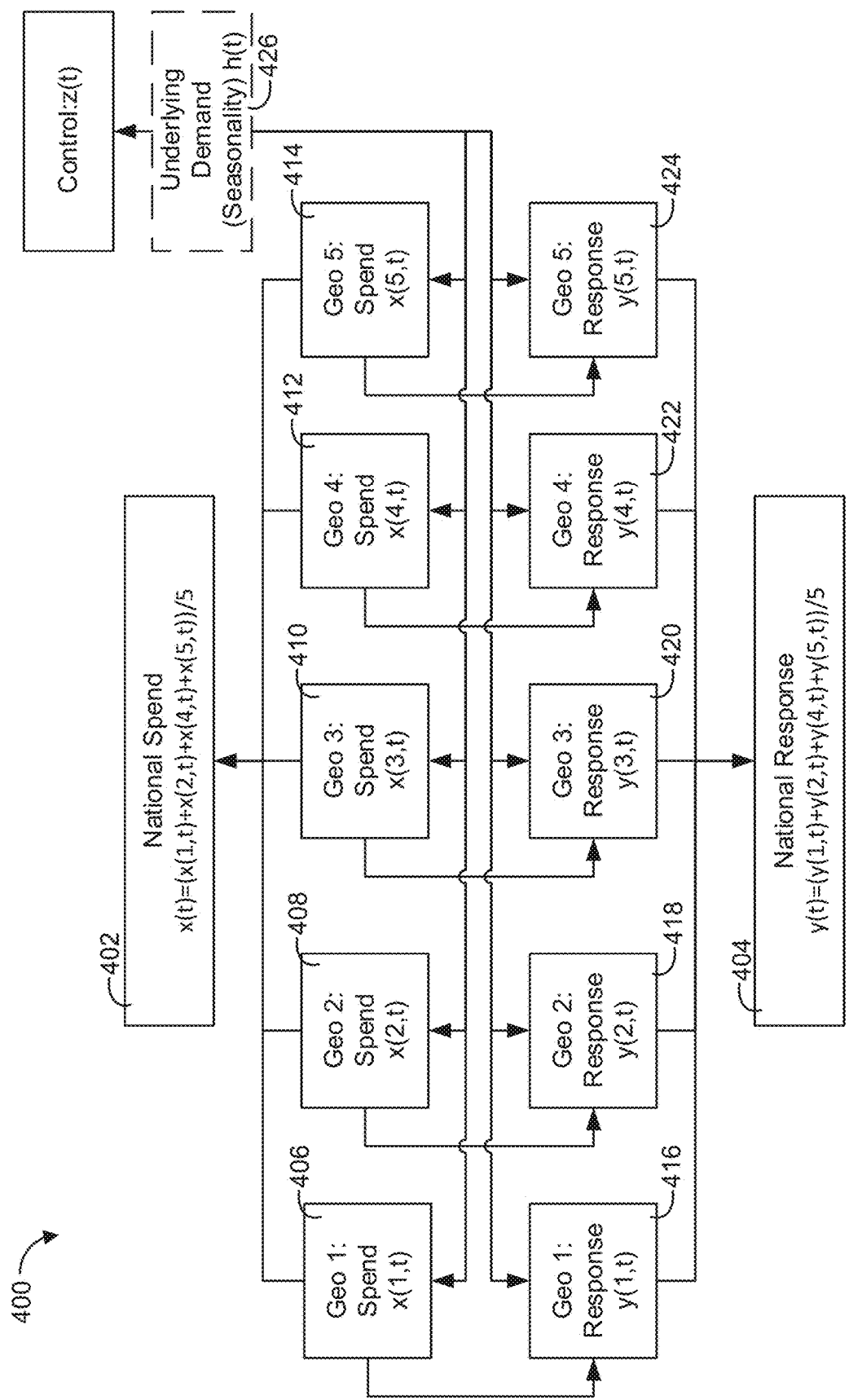
FIG. 4 is a block diagram of a simulation model for comparing the performance of the GBHMMM and the national-level BMMM according to an illustrative implementation.

Referring now to FIG. 4, a simulation model 400 is shown for comparing the performance of the GBHMMM 138 with the national-level BMMM. The national-level BMMM may act as a baseline for identifying the performance of the GHBMMM 138. In FIG. 4, the spend (e.g., the content input) for the geos 134 and the response for each of the geos 134 is shown. In FIG. 4, the geos 134 include five separate geographic regions. The spend 406-141 and the response 416-424 may be part of the geo-level data 136 used to generate the GHBMMM 138. The data used to generate the national Bayesian model can be the average spend, i.e., the national spend 402, which is the average of spends 406-414. The national response 404 may be the average of the responses 416-424. Specifically, the national Bayesian model can be generated based, at least in part, on the national spend 402 and the national response 404.

FIG. 4 further illustrates the process of simulating the geo-level and national-level media mix data. FIG. 4 also illustrates simulating the unobserved base demand $h_t$ (i.e., underlying demand 426) as a sinusoid shared across geos. Further, FIG. 4 illustrates simulating the geo-level media spend positively correlated with the base demand and simulating the geo-level response variable based on the media spend and the base demand. FIG. 4 further illustrates simulating the control variable positively correlated with the base demand $h_t$. Simulated data in the dashed line box i.e., the underlying demand 426 may not be observed and may not be used in modeling. The ratio of standard deviation of spend to standard deviation of dollar sales may be a key indicator of how much information the data can contain about the impact of the media. The parameter values chosen for this simulation are more favorable to the modeler than is typical.

When only national-level data is available, the data would be used to fit a Bayesian media mix model (BMMM) (the national-level BMMM). The national-level BMMM can use media mix data aggregated at the national-level and assumes (Equation 20-21), $$y_t = \tau + \sum_{m=1}^{M} \beta_m \text{Hill}(x^*_{t,m}(\alpha_m, L); K_m, S_m) + \sum_{c=1}^{C} \gamma_c z_{t,c} + \epsilon_t,$$

$$\epsilon_t^{iid} \sim \text{normal}(0, \sigma^2)$$

where $y_t$ is the response variable, $x_{t,m}$ is the spend of media channel m, for m=1, ..., M and $z_{t,c}$ is the control variable for c=1, ..., C at the time t. $\tau$, $\beta=(\beta_1, \ldots, \beta_M)$, $\gamma=(\gamma_1, \ldots, \gamma_C)$ are the hyper-parameters. Priors may be needed for $\tau$, $\beta$, $\gamma$, $\alpha$, K, S, $\sigma$.

The GBHMMM 138 can be fit using the geo-level data (e.g., the spends 406-414 and the response 416-424) and then compared with the national-level BMMM that uses the national-level data aggregated from the geo level (e.g., the national spend 402 and the national response 404). In order to have an accurate comparison between the two models, the Hill(·) function and the adstock(·) function, the chosen priors, as well as the standardization and scaling of variables should be the same for the GBHMMM 138 based on the geo level data (e.g., spends 406-414 and responses 416-424) and the national-level BMMM based on the national-level data (e.g., the national spend 402 and the national response 404).

As the GBHMMM 138 uses pooled data across the geos 134 to increase the effective sample size, it generally provides tighter credible intervals than the national-level model when the geos are similar in terms of the media impact mechanism.

The optimal media mix (e.g., a content input mix), the average return on ad spend (ROAS), and the marginal return on ad spend (mROAS) for the GBHMMM 138 can be generated by the modeler 124. The national ROAS and mROAS can be used to evaluate the national-level BMMM and the GBHMMM 138 in the various simulations and modeling examples described herein.

Letting the predicted sales at the geo g and the time t be $\hat{Y}_{t,g}(X_{t,g}; \Phi_g)$, where $X_{t,g}=\{X_{s,m,g}, s \leq t, 1 \leq m \leq M\}$ is the time series of the media spend at geo 134 g up to time t and $\Phi_g$ is the model parameter of geo g. The GBHMMM 138 can provide multiple posterior samples for $\Phi_g$, i.e. $\Phi_{g,k}$ k=1, ... K. These posterior samples can be drawn from the posterior distribution for $\Phi_g$. Based on these posterior samples, the posterior mean of the predicted sales at geo g and time t can be written as $\Sigma_{k=1}^{K} \hat{Y}_{t,g}(X_{t,g}; \Phi_{g,k})/K$. The GBHMMM 138 may yield predicted sales per capita $\hat{y}_{t,g}$ and it may be necessary to multiply back the target population $s_g$ to obtain the predicted sales in geo g, i.e., $s_g \hat{y}_{t,g}$. The GBHMMM 138 may use media spend per capita $x_{s,m,g}$ and it may be necessary to scale back to the original media spend $X_{s,m,g}$ for calculating attribution metrics. The content input mix of the GBHMMM 138 can be determined by maximizing a posterior mean of a predicted response of the GBHMMM 138. Similar to the national-level model, an optimal media mix $X_g^*$ (e.g., the content input mix) can be derived by maximizing the predicted sales (e.g., the average response under the posterior distribution of model parameters) in the change period given a constraint on the total media spend for geo g. This method generally leads to a different optimal mix for each of the geos 134. If a common optimal mix is desired for all the geos 134, the optimization should be applied at the national-level given a constraint on the total national-level media spend, i.e., maximizing the posterior mean of the predicted national sales in the change period with fixed proportion of total media spend allocated to each of the geos 134.

The ROAS is the average change in revenue per unit spend on a particular media channel. The ROAS at the geo 134 g for the media m given a model parameter $\Phi_g$ is defined as (Equation 22), $$ROAS_{m,g}(\Phi_g) = \frac{\Sigma_{T_0 \leq t \leq T_1 + L - 1}(\hat{Y}_{t,g}(X_{t,g}^{1,m}; \Phi_g) - \hat{Y}_{t,g}(X_{t,g}^{0,m}; \Phi_g))}{\Sigma_{T_0 \leq t \leq T_1} X_{t,m,g}}$$

where $0 \leq T_0 < T_1 + L - 1 \leq T$ and $X_{t,g}^{a,m}$ represents the media spend time series at geo g up to time t with the m-th media spend multiplied by a constant $\alpha$ during the period $[T_0, T_1]$, for example, $X_{t,g}^{1,m}$ represents the observed media spend time series and $X_{t,g}^{0,m}$ represents the media spend time series with m-th media channel turned up during $[T_0, T_1]$. Although the media spend is only changed during the period $[T_0, T_1]$, the impact on sales is calculated in the range $[T_0, T_1+L-1]$ to account for the carryover effect. One reasonable choice of $[T_0, T_1]$ is the most recent one year of the sample period as older data may not be representative of the current environment while a shorter period is not protected from seasonality and may make the estimator less stable.

The mROAS is the incremental change in revenue caused by an additional unit in media spend. The mROAS may be perturbed at a 1% multiplicative increment on media channel m for geo g, defined as (Equation 23), $$mROAS_{m,g}(\Phi_g) = \frac{\Sigma_{T_0 \leq t \leq T_1+L-1}(\hat{Y}_{t,g}(X_{t,g}^{1.01,m}; \Phi_g) - \hat{Y}_{t,g}(X_{t,g}^{1,m}; \Phi_g))}{0.01 \times \Sigma_{T_0 \leq t \leq T_1} X_{t,m,g}}$$

where $X_{t,g}^{1.01,m}$ is the media spend time series with the m-th media spend multiplied by 1.01 during the period $[T_0, T_1]$.

The national ROAS and mROAS can be calculated similarly using the change of predicted sales and media spend aggregated at the national-level, i.e., $\Sigma_{g=1}^{G}\hat{Y}_{t,g}(X_{t,g}; \Phi_g)$ and $\Sigma_{g=1}^{G}X_{t,m,g}$. The national ROAS and mROAS for the media m given a model parameter $\Phi=(\Phi_1, \ldots, \Phi_G)$ are simply a weighted average of geo-level values (Equation 24), $$ROAS_m(\Phi) = \sum_{g=1}^{G} w_g ROAS_{m,g}(\Phi_g), mROAS_m(\Phi) = \sum_{g=1}^{G} w_g ROAS_{m,g}(\Phi_g),$$

where $w_g = (\Sigma_{T_0 \leq t \leq T_1} X_{t,m,g})/(\Sigma_{1 \leq g \leq G} \Sigma_{T_0 \leq t \leq T_1} X_{t,m,g})$ is the proportion of media spend in geo g during the change period $[T_0, T_1]$.

By plugging in each of the draws from a joint posterior distribution of model parameters, we obtain posterior samples of ROAS and mROAS. The calculation can be done for each geo as well as nationally. The values of ROAS and mROAS depend on the model parameters and the fighting strategy of the media spend over time. The estimation of ROAS requires prediction at zero media spend. If there are few observations close to zero, the model may not predict well at zero spend and thus the ROAS won't be estimated accurately, the mROAS is not affected as much. Since the national-level model cannot estimate ROAS and mROAS for each geo, the national-level BMMM and GBHMMM 138 can be compared through the national ROAS and mROAS.

The geo-level model (i.e., the GBHMMM 138) can be compared with the national-level BMMM in various simulation scenarios mimicking the challenges that mixed media models face. The models can be fit via simulated data sets. The comparison may be based on the national ROAS and mROAS as well as the response curve.

Assuming that there is only one media variable (M=1), one control variable (C=1), five geos 134 (G=5) and variables are aggregated weekly (e.g., spend 406-414 and response 416-424). The unobserved weekly seasonal base demand per capita $h_t$ is simulated as a sinusoid over time for two years (104 weeks), with mean zero and standard deviation one, $h_t=1.41 \cos(2\pi(t-12)/52)$, underlying demand 426. The media spend per capita in the one of geos 134, i.e., geo g, can be simulated to have a positive correlation $\rho_g$ with the base demand, $x_{t,g}=u_g+\rho_g h_t+\sqrt{1-\rho_g^2}v_{t,g}$, where $u_g$ is a constant and $v_{t,g}$ is white noise independent of $h_t$ and vec(v)~normal(0, $I_T \otimes I_G$). As the media spend should be non-negative, we take the positive part of $x_{t,g}$ as the media spend.

The geo level sales per capita $y_{t,g}$ can be simulated to depend on the base demand and the media spend (Equation 25-29), $$y_{t,g}=\tau_g+\beta_g \text{Hill}(x_{t,g}*(\alpha,L);K,S)+\gamma_g h_t+\epsilon_{t,g},$$

$$\tau_g^{iid}\sim\text{normal}(\tau,\kappa^2), \beta_g^{iid}\sim\text{normal}(\beta,\eta^2), \gamma_g^{iid}\sim\text{normal}(\gamma,\xi^2), \epsilon_{t,g}^{iid}\sim\text{normal}(0,\sigma^2),$$

where the parameters are summarized in Table 1. The patterns of unobserved base demand $h_t$ as well as the carryover and shape effect are shared across geos.

The control variable $z_{t,g}$ can be simulated for each geo to be positively correlated with the underlying base demand, $h_t$, $z_{t,g}=\rho_z h_t+\sqrt{1-\rho_z^2}w_{t,g}$, where $w_{t,g}$ is white noise independent of $h_t$ and vec(w)~normal(0, $I_T \otimes I_G$). As $h_t$ is unobserved, we would use $z_{t,g}$ instead of $h_t$ to build models.

TABLE 1

Model Parameters

| α | K | S | L |
|---|---|---|---|
| 0.5 | 2 | 3 | 4 |
| β | τ | γ | |
| 2 | 4 | 2 | |
| κ | η | ξ | σ |
| 0.1 | 0.1 | 0.1 | 0.2 |

It may be assumed that all simulated variables are the amount per capita. Assuming that the geographic regions (e.g., goes 134) are of equal size, the national-level variables are simply the average of the geo-level variables (Equation 30), $$x_t = \frac{1}{G}\sum_{g=1}^{G} x_{t,g}, z_t = \frac{1}{G}\sum_{g=1}^{G} z_{t,g}, y_t = \frac{1}{G}\sum_{g=1}^{G} y_{t,g}.$$

TABLE 2

Priors on the model parameters

| α | K | S |
|---|---|---|
| uniform(0, 1) | uniform(0, 5) | gamma(1.5, 0.5) |
| β | τ | γ |
| normal(0, $5^2$) | normal(0, $5^2$) | normal(0, $5^2$) |

When the geographic regions (e.g., the geos 134) have the same distribution of media spend, the true national-level response curve is approximately the same as the geo-level response curve $\beta\text{Hill}(x; K, S)$. The two curves diverge when the geos have distinct average media spend. The national level response curve can be approximately $$\frac{1}{G}\Sigma_{g=1}^{G}\beta\text{Hill}(w_g xG; K, S),$$

where $w_g$ is the proportion of media spend allocated to geo g and x is the media spend per capita at the national level.

FIG. 4 summarizes this bottom-up simulation process. In the following simulation studies, we fit the GBHMMM 138 using the geo level data and the national-level BMMM using the aggregated national-level data for each of the 100 simulated datasets. As the media spend time series are different across simulated datasets, the true ROAS and mROAS are slightly different in each simulation as well. We place the same priors on the shared model parameters of the GBHMMM 138 and BMMM (Table 2). Both models are fit using a Gibbs sampler with 10,000 iterations. The first half of the iterations can be set as burn-in iterations.

Posterior means of the response curves βHill(x; K, S) and ROAS metrics can be reported for each model on each simulated dataset. Letting $R_i$ be the true ROAS and $\hat{R}_i$ be the model based posterior mean of the ROAS from the i-th simulated dataset, for i=1, ..., 100. The relative bias of the ROAS is defined as $$\frac{1}{100}\Sigma_{i=1}^{100}\frac{\hat{R}_i - R_i}{R_i}$$

and the mean squared error (MSE) of the ROAS is defined as $$\frac{1}{100}\Sigma_{i=1}^{100}(\hat{R}_i - R_i)^2.$$

The GBHMMM 138 benefits from a larger effective sample size and more useful variation in the data, and thus has tighter credible intervals and yields less biased point estimates than the national-level BMMM. The improvement may be more pronounced when the ranges of the media spend per capita significantly vary across geographic regions. The correlation between the media spend and the base demand $\rho_g$ can be set to 0.5 across all the geos. The control variable is simulated to perfectly capture base demand $h_t$, i.e., $z_{t,g}=h_t$, for g=1, ..., G.

Simulation I: Homogeneous Spend Distribution Across Geographic Regions

Simulation I is a simulation performed to identify the performance of the GBHMMM 138 with homogeneous spending distribution across geographic regions. This simulation can be performed with the systems and methods described with reference to FIGS. 1-3 i.e., specifically with the Bayesian modeler 122 (e.g., the data manager 126 and/or the modeler 124). Simulation I is discussed with respect to FIGS. 5-7. In Simulation I, all the geos have the same distribution of media spend, with a mean spend of $u_g$=2 and standard deviation one, for g=1, ..., G.

Figure 5:
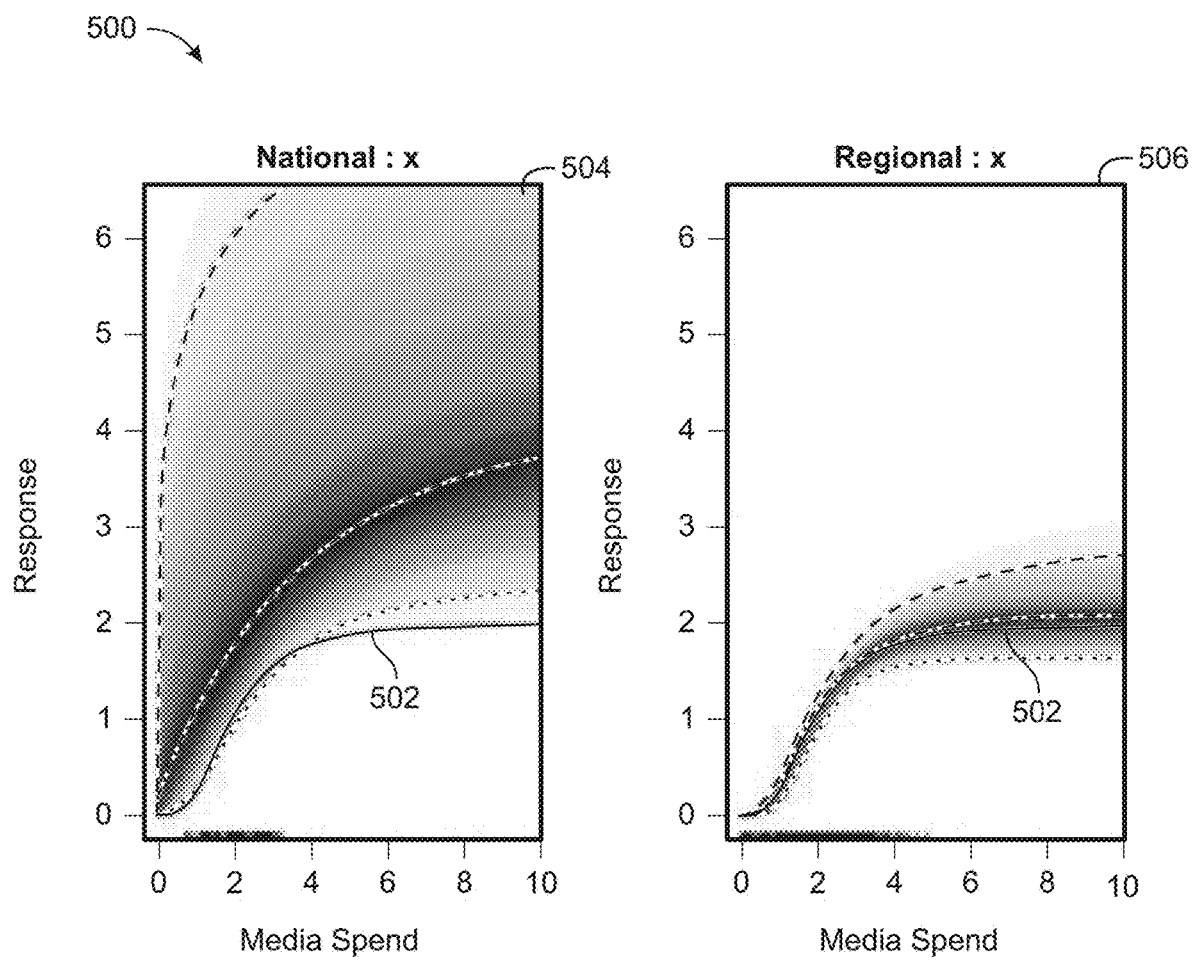
FIG. 5 is a set of charts comparing the posterior means of the GBHMMM and the national-level BMMM for a simulation with homogenous spending across geographic regions according to an illustrative implementation.
Figure 6:
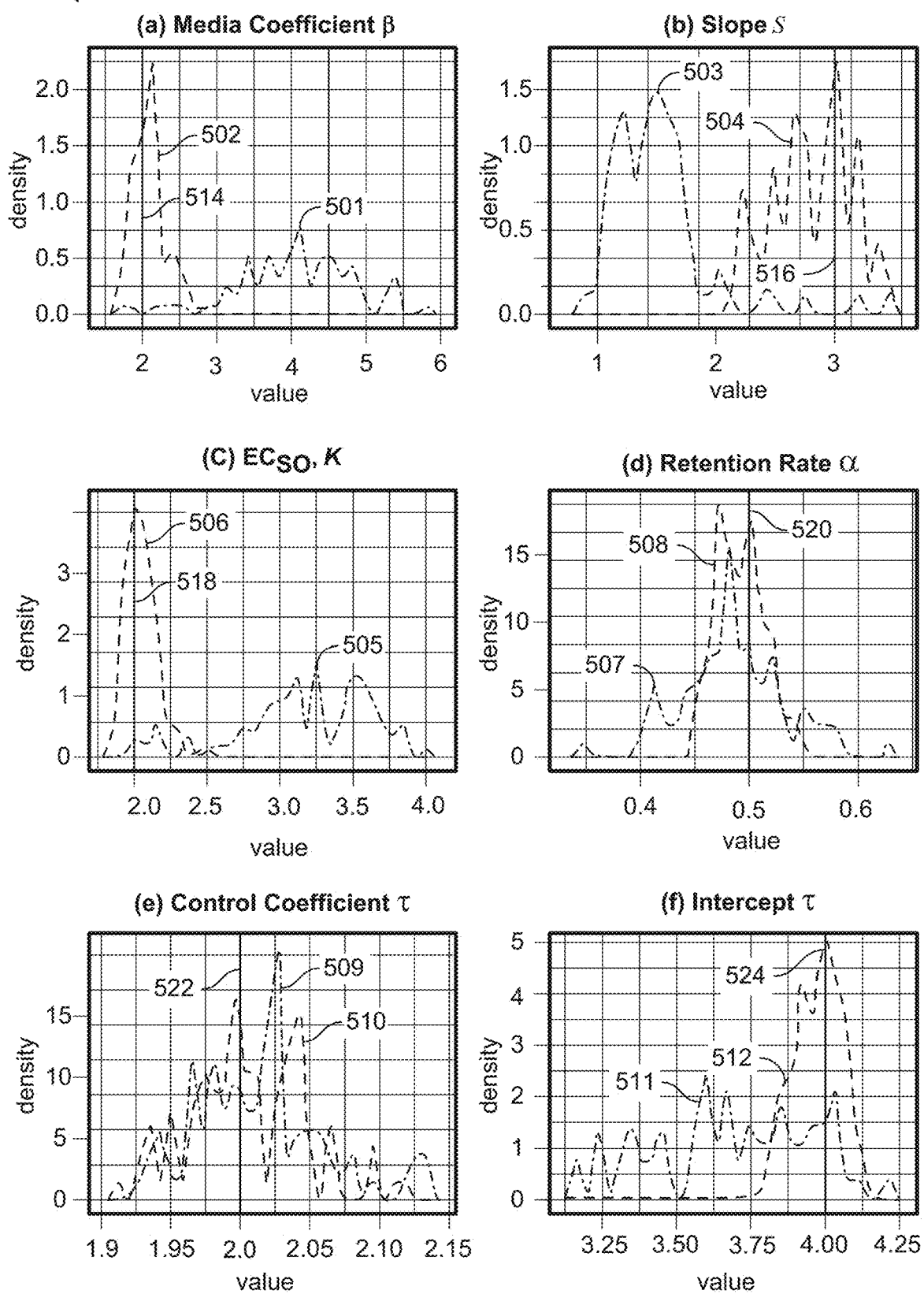
FIG. 6 is a set of charts illustrating posterior medians of the GBHMMM for a simulation with homogenous spending across geographic regions according to an illustrative implementation.

Pointwise posterior means of the response curves for the GBHMMM 138 and the national-level BMMM across simulated datasets are shown in FIG. 5, plotted using the R package boom. It shows that the geo level data has wider range of media spend than the national-level data. The BMMM (e.g., the national-level model) performs much worse than the GBHMMM 138 with more uncertainty and larger bias, especially in the region where few observations are available, i.e. in the beginning of the curve (x<1) and the end of curve x>3. In the middle of the curve 1≤x≤3 where the curve is almost linear, the national-level BMMM captures the shape of the curve but is positively biased. The bias in the response curve comes from the particular shape of the response curve and low variation in the media spend which mislead the national-level model to underestimate the slope S and the intercept τ while overestimating the media coefficient β (FIG. 6). The parameters are compensating for each other so that the model has better fit in regions with more observations.

Referring now to FIG. 5, simulation results for the BMMM and the GBHMMM 138 with homogeneous spend distribution across geographic regions is shown. The charts 500 illustrate pointwise posterior means of response curves βHill (x; K, S) over 100 simulated datasets. The response for the national-level BMMM is shown in chart 504 while the response for the GBHMMM 138 is shown in chart 506. The geo level media spends are simulated to have the same distribution. The darker the area, the denser the curves. The true response curve is line 502. The tick marks along the x-axis shows the values of media spend used in the model.

Referring now to FIG. 6, charts 600 are shown illustrating the density of posterior medians of the parameters for the national-level BMMM and the GBHMMM 138 are shown. The charts 600 illustrate the density of posterior medians of parameters of the BMMM and the GBHMMM 138 for over 100 simulated datasets. The national-level model posterior medians are illustrated via lines 501-511. The GBHMMM 138 posterior medians are illustrated via lines 502-512. The vertical lines 514-524 indicates the true values for the parameters.

Figure 7:
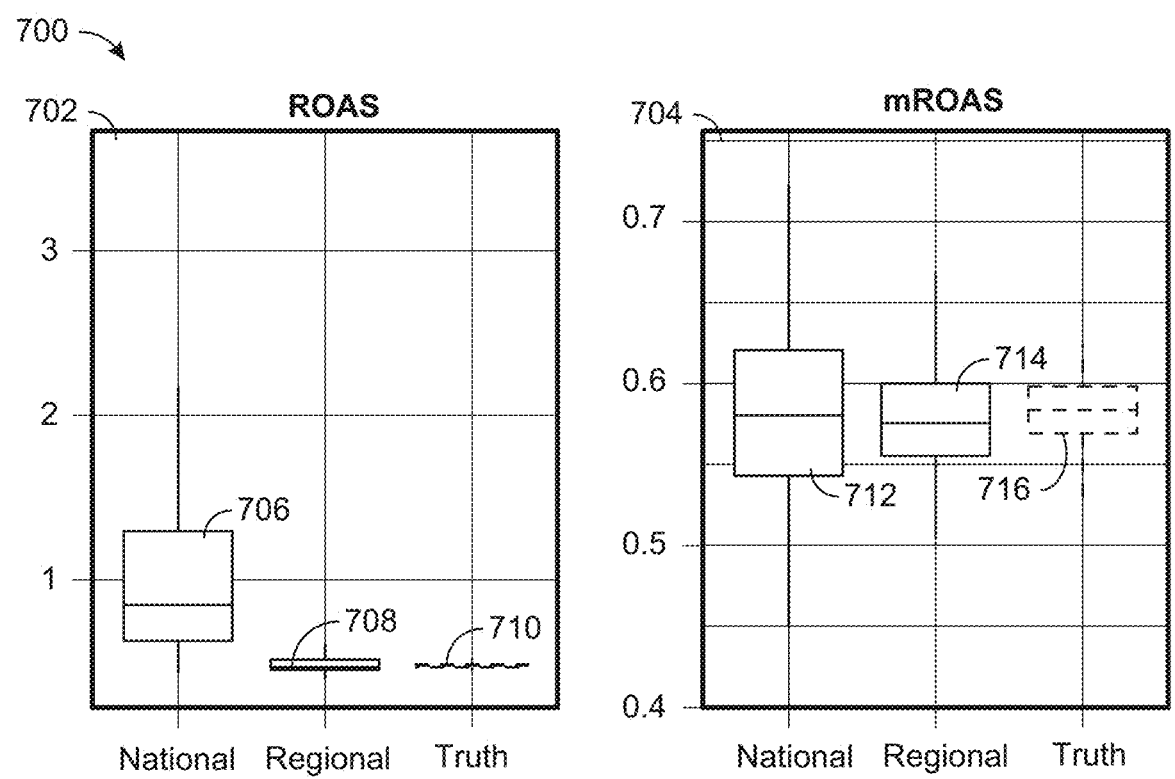
FIG. 7 is a set of charts illustrating return on average spend (ROAS) and marginal return on average spend (mROAS) for the GBHMMM and the national-level BMMM for a simulation with homogenous spending across geographic regions according to an illustrative implementation.

Referring to FIG. 7, charts 700 are shown illustrating ROAS and mROAS for the national model and the GBHMMM 138. The boxplot results of the estimated national ROAS and mROAS for the GBHMMM 138 and the national model were generated from over 100 simulated datasets. The geo level media spends are simulated to have the same distribution. Charts 700 include box plot 702 and box plot 704, box plot 702 illustrating ROAS and box plot 704 illustrating mROAS. Marker 706 illustrates the ROAS for the national-level BMMM while marker 708 illustrates the marker for the GBHMMM 138. Marker 710 illustrates the truth, i.e., the target for both the national model and the GBHMMM 138 model. As can be seen in chart 700, the GBHMMM 138 is more accurate than the national-level BMMM.

The box plot 704 illustrates mROAS for the GBHMMM 138 and the national-level BMMM. A marker 712 illustrates the mROAS for the national-level model while a marker 714 illustrates the mROAS for the GBHMMM 138. A marker 716 illustrates the true mROAS. As can be seen in the box plot 704, the GBHMMM 138 outperforms the national model and has an mROAS closer to the true mROAS than the national model. The table below, table 3, illustrates the bias and mean squared error (MSE) for the national and regional model, i.e., the BMMM (i.e., the national-level model) and the GBHMMM 138.

TABLE 3

| Simulation I: Bias and MSE of the average ROAS estimates | | | | |
|---|---|---|---|---|
| model | mean.bias | mse | relative.mean.bias | relative.mse |
| National | 0.62 | 0.82 | 132.62% | 3.81 |
| Regional | 0.01 | 0.00 | 2.06% | 0.01 |

FIG. 7 shows the average and marginal ROAS estimates. As the national-level model overestimates the response curve, it overestimates the average ROAS. On the other hand, as the national-level BMMM captures the slope of the curve in the region with majority of the observations, its marginal ROAS seems to be much less biased than the average ROAS. Nonetheless it still has much more uncertainty than the geo-level estimate. In general, the geo-level model has tighter credible interval and lower bias for the average ROAS than the national-level model as demonstrated by Table 3.

Simulation II: Heterogeneous Spend Distribution Across Geographic Regions

Figure 8:
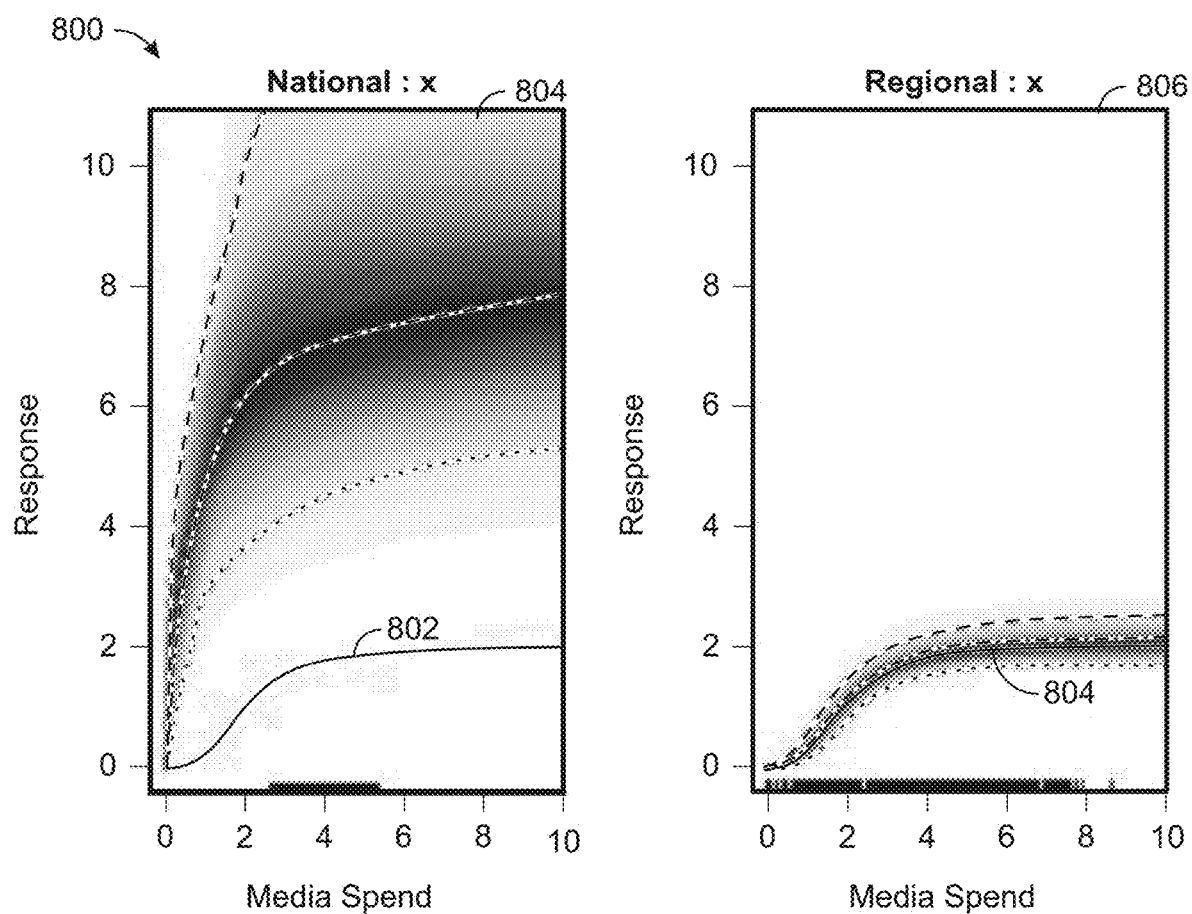
FIG. 8 is a set of charts comparing the posterior means of the GBHMMM and the national-level BMMM for a simulation with heterogeneous spending across geographic regions according to an illustrative implementation.
Figure 9:
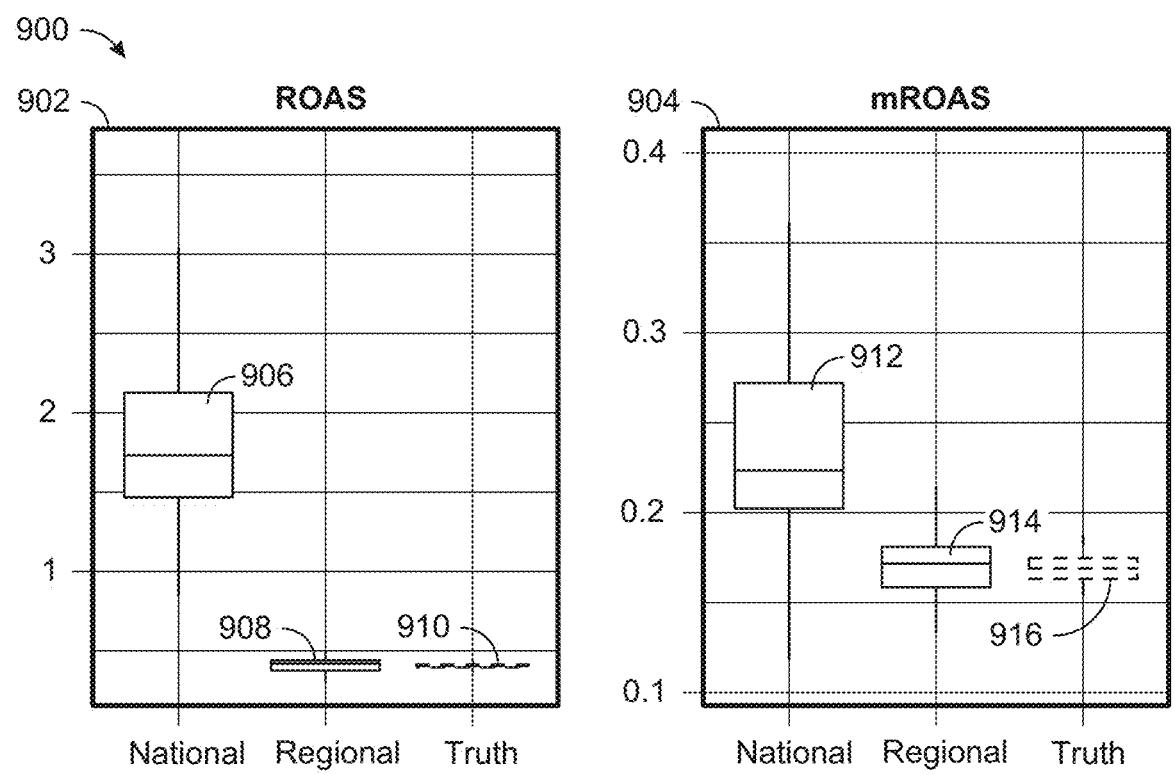
FIG. 9 is a set of charts illustrating ROAS and mROAS for the GBHMMM and the national-level BMMM for a simulation with heterogeneous spending across geographic regions according to an illustrative implementation.

Simulation II is a simulation for analyzing the performance of the GBHMMM 138 with heterogeneous spending distribution across geographic regions. Simulation II is discussed with reference to FIGS. 8-9. Referring generally to FIGS. 8-9, simulation results for simulating the GBHMMM 138 and the national model are shown with heterogeneous spending distribution across geographic regions. With heterogeneous spend distribution across geos, the mean media spend is different across geos 134, in particular, geo g has an average media spend g+1 and standard deviation one for g=1, . . . , G. Some geos have reached the saturation point of media spend while others have not.

Referring now to FIG. 8, charts 800 illustrate pointwise posterior means of the response curve βHill(x; K, S) over 100 simulated datasets for the national model and the GBHMMM 138 are shown. Chart 804 illustrates the response for the national-level BMMM while chart 806 illustrates the response for the GBHMMM 138. The geo level media spends can be simulated to have distinct distributions and thus explore different parts of the response curves. In charts 800, the darker the area, the denser the curve. The true response curves for charts 800 are shown by line 802. The tick marks along the x-axis shows the values of media spend used in the model. Charts 800 shows that geo-level data has wider range of media spend than national-level data and the difference is more pronounced than that in Simulation I where there was homogeneous spending distribution across geos. As a result, the nationally aggregated data masks even more information available at the geo level. The national-level BMMM is not able to recover the true response curve while the GBHMMM 138 can.

Referring now to FIG. 9, charts 900 illustrate ROAS and mROAS for the GBHMMM 138 and the national model. Charts 900 illustrate the estimated national ROAS and mROAS over 100 simulated data sets. The geo level media spends are simulated to have distinct distributions and thus explore different parts of the response curves. A box plot 902 illustrates ROAS for the national model and the GBHMMM 138 while a box plot 904 illustrates mROAS for the national model and the GBHMMM 138. A marker 906 illustrates the ROAS for the national model while a marker 908 illustrates the ROAS for the GBHMMM 138. The true ROAS is illustrated by marker 910. Marker 912 illustrates the mROAS for the national model while the marker 914 illustrates the mROAS for the GBHMMM 138.

A marker 916 illustrates the true mROAS. The national-level model yields estimates with more bias and uncertainty for both average and marginal ROAS than the geo-level model. Table 4 demonstrates that the GBHMMM has lower bias and mean squared error for the average ROAS and the improvement over BMMM is more pronounced than the first simulation study. The relative bias of the ROAS estimate from the national-level BMMM is more than 300 times of that from the GBHMMM 138.

TABLE 4

Simulation II: Bias and MSE of the average ROAS estimates

| Model | mean.bias | mse | relative.mean.bias | relative.mse |
| --- | --- | --- | --- | --- |
| National | 1.41 | 2.22 | 356.7% | 14.18 |
| Regional | 0.01 | 0.00 | 1.35% | 0.01 |

Simulation I and Simulation II are ideal cases, free of omitted variables and model misspecification which often exist in the real data. In a third simulation, Simulation III, discussed with reference to FIGS. 10-11, the performance of the GBHMMM 138 simulated data with more complex settings mimicking the challenges faced by modelers in practice.

Simulation III: Advertising Bias

Figure 10:
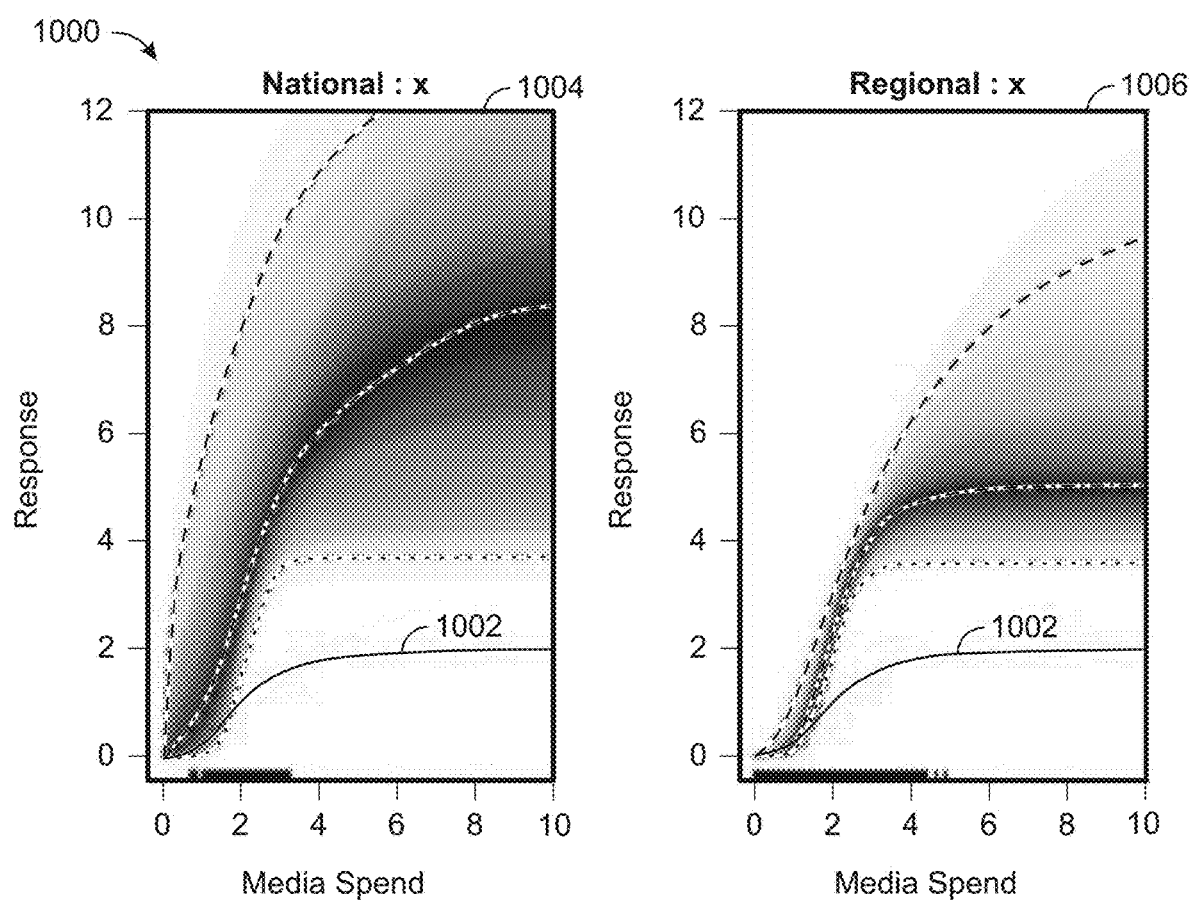
FIG. 10 is a set of charts comparing the posterior means of the GBHMMM and the national-level BMMM for a simulation with advertisement targeting bias according to an illustrative implementation.
Figure 11:
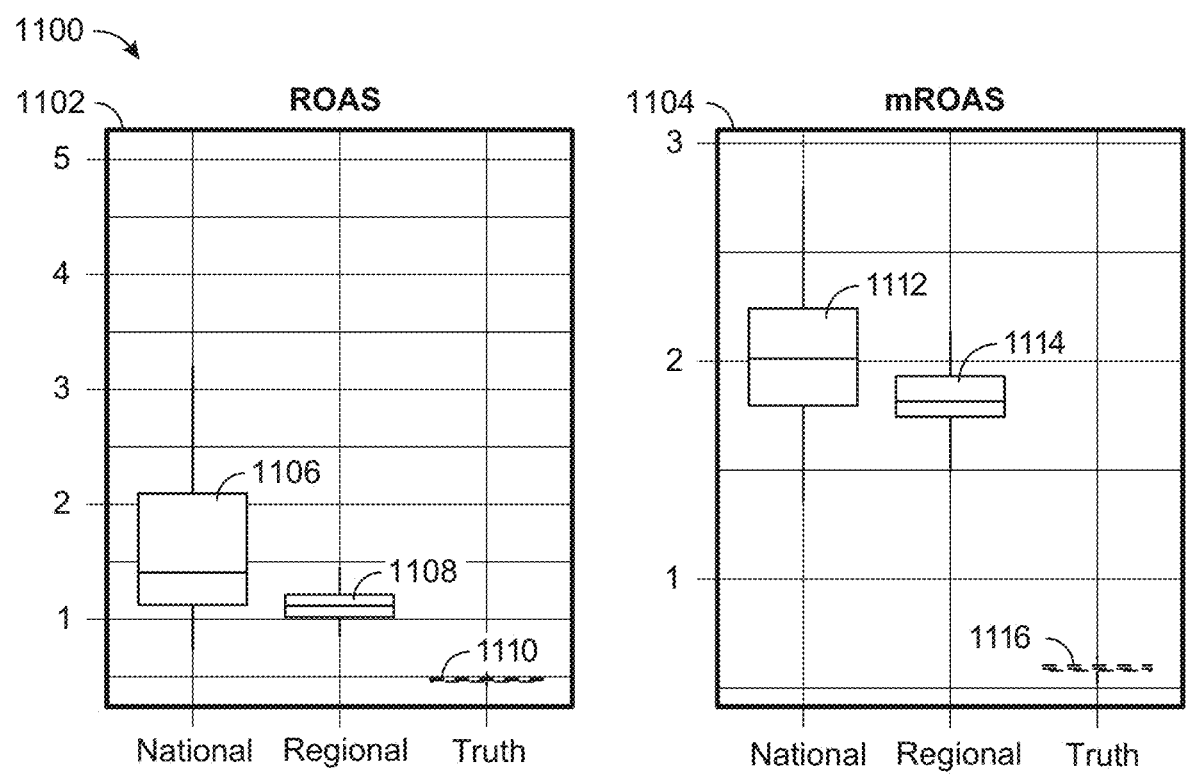
FIG. 11 is a set of charts illustrating ROAS and marginal mROAS for the GBHMMM and the national-level BMMM for a simulation with advertisement targeting bias according to an illustrative implantation.

Referring generally to FIGS. 10-11, simulation results for simulating the GBHMMM 138 and the national-level BMMM with advertising bias is shown. It is demonstrated that that with advertising bias, the GBHMMM 138 helps tighten credible intervals and can reduce bias in the presence of sufficient independent variation in media spend at the geo level. Advertising bias occurs when the advertiser directs marketing efforts towards the underlying base demand, and hence the media spend is highly correlated with the base demand. When the control variable $z_{t,g}$ does not perfectly capture the base demand $h_t$, bias is introduced and the media attribution will be incorrect. The higher the correlation between the media spend and base demand, the more severe the bias. Search query data can control for advertising bias in paid search.

The correlation between the media spend and the base demand $\rho_g$ can be set to be 0.5 and the average media spend $u_g$ to be 2 across all the geos. The control variable $z_{t,g}$ is simulated to be positively correlated with the base demand $h_t$ with correlation cor($z_{t,g}$, $h_t$)=0.8, g=1, . . . , G. The simulation setting may be identical to Simulation I except that the control variable does not well capture the underlying base demand and thus introduces advertising bias.

As the national-level media spend is an average over the geo level media spend, it generally has a higher correlation with the base demand $h_t$ than the geo level data, as long as the geo level base demands are positively correlated. The derivation of geo-level correlation is discussed herein. As a result, it can be expected the national-level BMMM has worse performance than the GBHMMM 138 when $h_t$ is not perfectly captured by the control variable. In other words, the independent variation at the geo-level can help reduce the correlation between the media spend and base demand and thus reduces the biases in the estimates.

Referring now to FIG. 10, charts 1000 illustrate pointwise posterior means of response curves βHill(x; K, S) over 100 simulated datasets for the GBHMMM 138 and the national-level BMMM. The response for the national-level BMMM is shown by chart 1004 while the GBHMMM 138 is shown by chart 1006. In this study, the control variable does not fully capture the base demand and thus introduce advertising bias. The correlation between the media spend and the base demand is simulated to be the same across geos. The darker the area is, the denser the curves are. The true response curve is marked by line 1002. The tick marks along the x-axis shows the values of media spend used in the model.

FIG. 10 shows that both the national-level BMMM and the GBHMMM 138 yield biased estimates of response curves because of advertising directed efforts. However, the geo level model benefits from the lower correlation between the media spend and base demand and thus has lower bias for the national ROAS and mROAS as illustrated in FIG. 11 and Table 5. The mean squared error of the ROAS estimates from the geo-level model is only one fifth of that from the national-level model.

TABLE 5

Simulation III: bias and mse of the national ROAS estimates

| model | mean.bias | mse | relative.mean.bias | relative.mse |
|---|---|---|---|---|
| National | 1.23 | 2.22 | 263.03% | 10.19 |
| Regional | 0.65 | 0.45 | 140.06% | 2.08 |

Referring now to FIG. 11, charts 1100 illustrate ROAS and mROAS for the national model and the GBHMMM 138 with simulated advertising bias. The charts 1100 illustrate the estimated national ROAS and mROAS over 100 simulated datasets. In this study, the control variable does not fully capture the base demand and thus introduce advertising bias. The correlation between the media spend and the base demand is simulated to be the same across geos. Box plot 1102 illustrates the ROAS while a box plot 1104 illustrates mROAS. A marker 1106 illustrates ROAS for the national model, a marker 1108 illustrates ROAS for the GBHMMM 138, while a marker 1110 illustrates the true ROAS. For box plot 1104, a marker 1112 illustrates mROAS for the national-level BMMM, a marker 1114 illustrates mROAS for the GBHMMM 138, while a marker 1116 illustrates the true mROAS.

Simulation IV: Imputed Geo-Level Media Spend

Figure 12:
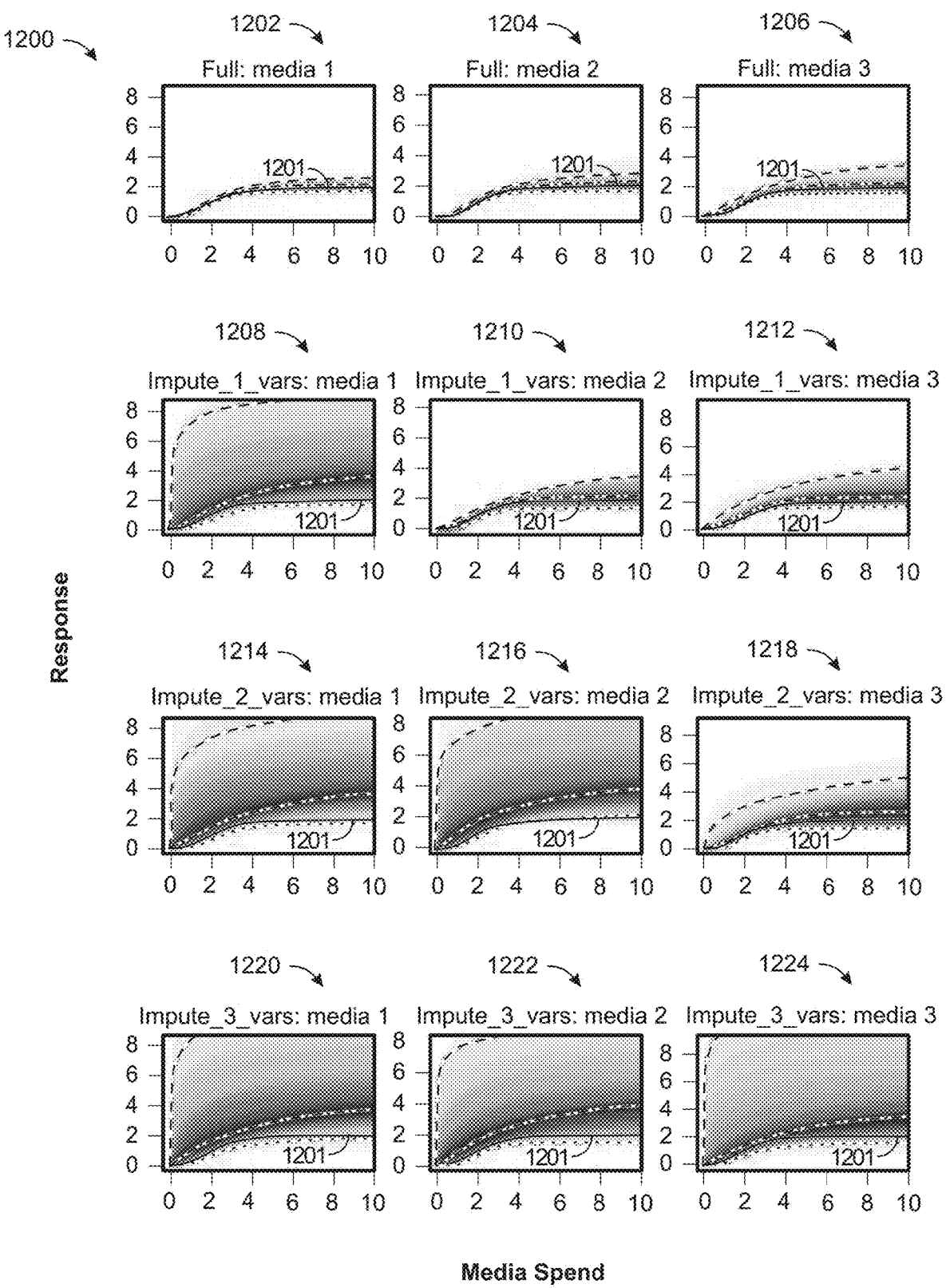
FIG. 12 is a set of charts illustrating the posterior means of the GBHMMM for a simulation with imputed geo-level spend according to an illustrative implementation.
Figure 13:
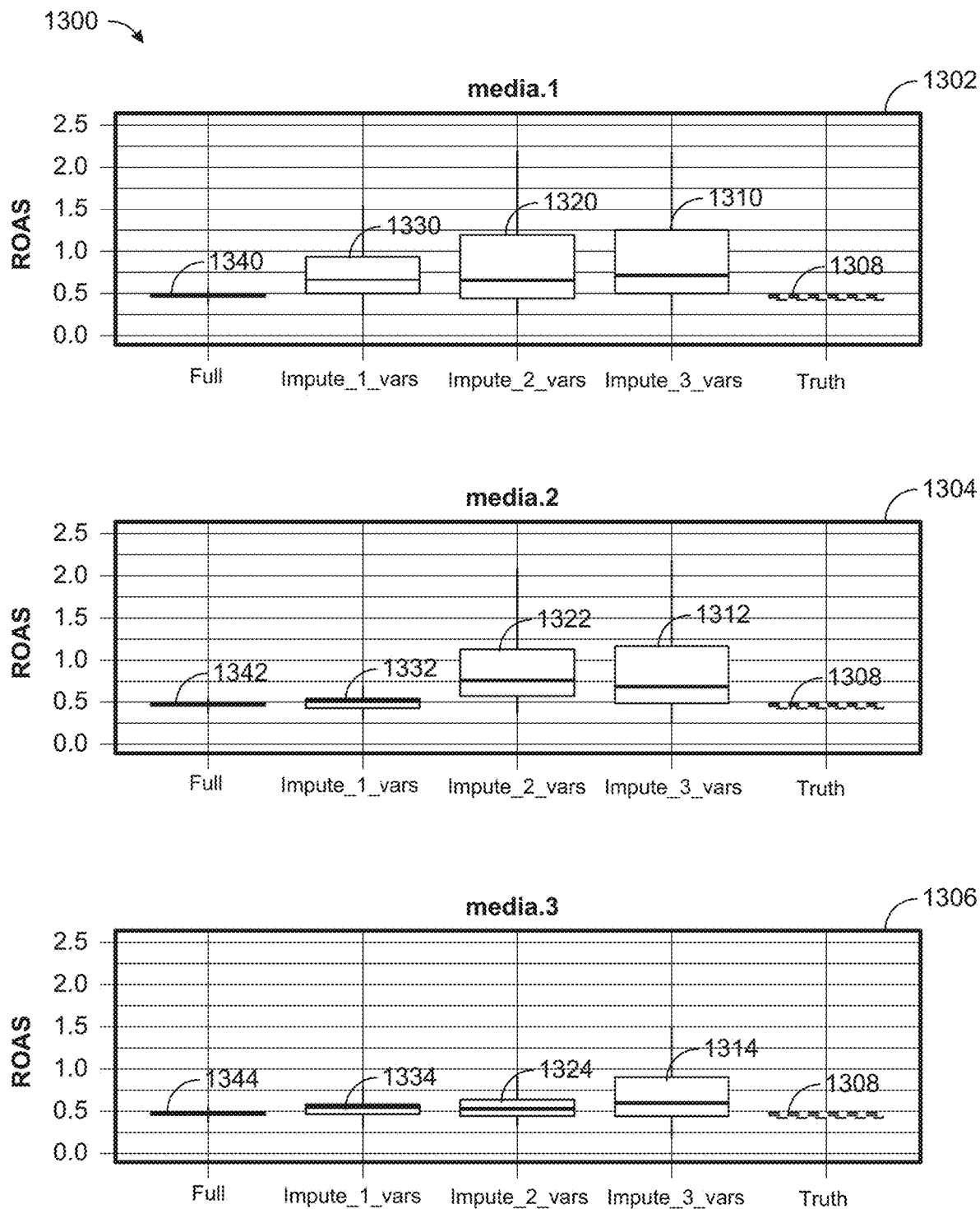
FIG. 13 is a set of charts illustrating ROAS for the GBHMMM for a simulation with imputed geo-level media spend according to an illustrative implementation.

Simulation IV, discussed with reference to FIGS. 12-13 explores the performance of the GBHMMM 138 when the geo-level media spend is imputed for particular media channels. Referring generally to FIGS. 12-13, simulation results for imputed geo-level media spend are shown for the GBHMMM 138. In this section, the risk of using imputed geo-level media spend in the GBHMMM 138 through simulation is explored.

It is generally easier to obtain geo-level data for digital media than offline media such as television or magazine, where spend is usually aggregated at the national-level. When a media variable is not available at the geo-level, there is the option to impute the data. One imputation method is to approximate the geo-level media variable from its national-level value, using the proportion of the population in the geo, relative to the population. There are other imputation methods, but many imputation methods do not introduce useful variability over time. For the purpose of this simulation study, the approximation approach is used to illustrate the potential issues with the imputed geo-level media spend.

The GBHMMM 138 with the actual regional level spend can be referred to as the full GBHMMM 138 while the GBHMMM 138 with the media spend imputed by the national-level spend can be referred to as the imputed GBHMMM 138. Three media variables are simulated using the same model parameters as in Table 1, denoted media.1, media.2, and media.3, each positively correlated with the base demand at the geo level. The correlation is set to be 0.5 for all three media channels. Conditioning on the base demand, the three media variables are independent over time. Other simulation settings are kept the same as in Simulation I.

The GBHMMM 138 can be fit to each of the following data sets. The first is a full data set, all media variables are observed at the geo level, referred to as "Full" dataset. The second data set imputes only media.1, this is referred to as the "Impute_1_vars" data set. The third data set has both media.1 and media.2 imputed, this is referred to as the "Impute_2_vars" data set. The fourth data set has all three media variables of the data set imputed, this data set is referred to as the "Imput_3_vars" dataset. Geo-level response variables are observed in the four datasets despite that the geo-level media spend are partially observed in some.

Referring now to FIG. 12, charts 1200 illustrate estimated response curves for over 100 simulated datasets for the four data sets for the GBHMMM 138. Graphs 1202-1206 illustrate the performance of the GBHMMM 138 with "Full" data set. Graphs 1208-1212 illustrate the performance of the GBHMMM 138 with "Impute_1_vars" data set. Graphs 1214-1218 illustrate the performance of the GBHMMM 138 with "Impute_2_vars" data set. Graphs 1220-1224 illustrate the performance of the GBHMMM 138 with "Impute_3_vars" data set. Each curve shown in the charts 1200 is the pointwise posterior mean of the curves given draws of the posterior samples of parameters for each simulated dataset. The columns are media channels and the rows are simulated datasets with increasing number of imputed media variables (from top to bottom).

The charts 1200 of FIG. 12 illustrate that the imputed GBHMMM 138 generally yields larger biases and wider credible intervals for the response curves than the GBHMMM 138 using the full geo-level media spend. In charts 1200, the true response is illustrated by curve 1201. Further, the performance of the estimates deteriorates as more media variables are imputed. Similar to the national-level model described herein, the positive biases in the estimated response curves and the ROASs of the imputed geo-level model stem from the low variation in the imputed geo-level media spend and the geometry of the Hill transformation. In this simulation, the geo-level time series of a media channel are positively correlated among themselves, so the national-level media spend as a substitute has positive correlation with the geo-level spends. The situation could be even worse if some of the geo-level media spends are negatively correlated. Hence, it is important to obtain accurate geo level data for valid media mix inference with the GBHMMM 138. On the other hand, this example confirms that the (partially) imputed geo-level model still yields useful information about the model parameters.

Referring now to FIG. 13, charts 1300 illustrates three boxplots 1302, 1304, and 1306 of the estimated national average ROAS for the GBHMMM 138 for three different medial channels (e.g., Internet advertising, radio advertising, printed advertising, etc.) for over 100 simulated datasets is shown. Marker 1308 indicates the true ROAS for each media channel. Markers 1310, 1312, and 1314 indicate the ROAS for the three media channels with the "Imput_3_vars" data set, the markers 1320, 1322, and 1324 indicate the ROAS for the three media channels for the "Impute_2_vars" dataset, markers 1330, 1332, and 1334 indicate ROAS for the "Input_1_vars" data set for the three media channels, and the markers 1340, 1342, and 1344 indicate the ROAS for the "Full" data set for the three media channels.

Charts 1300 compare the model performance over simulated datasets with increasing number of imputed media variables. In FIG. 13 and Table 6, it appears that when only media.1 is imputed, the ROAS estimates for media.2 and media.3 are slightly worse than those of the full geo-level model, but are still reasonable. This may be due to the fact that the correlation between the media variables and the base demand is only 0.5. If the correlations among the media variables increase, we would expect to see worse performance for media.2 and media.3.

TABLE 6

Simulation IV: bias and mse of the national ROAS estimates

| media.var | Model (Dataset) | mean.bias | mse | relative.mse.bias | relative.mse |
|---|---|---|---|---|---|
| media.1 | Full | 0.00 | 0.00 | 1.13% | 0.01 |
| media.1 | Impute_1_vars | 0.57 | 1.10 | 128.9% | 5.57 |
| media.1 | Impute_2_vars | 0.70 | 1.82 | 158.91% | 9.47 |
| media.1 | Impute_3_vars | 0.76 | 1.75 | 170.81% | 8.85 |
| media.2 | Full | 0.01 | 0.00 | 2.29% | 0.01 |
| media.2 | Impute_1_vars | 0.02 | 0.01 | 4.74% | 0.04 |
| media.2 | Impute_2_vars | 0.72 | 1.40 | 162.48% | 7.08 |
| media.2 | Impute_3_vars | 0.60 | 1.12 | 134.51% | 5.62 |
| media.3 | Full | 0.02 | 0.00 | 3.41% | 0.02 |
| media.3 | Impute_1_vars | 0.07 | 0.03 | 16.04% | 0.15 |
| media.3 | Impute_2_vars | 0.13 | 0.09 | 28.91% | 0.46 |
| media.3 | Impute_3_vars | 0.56 | 1.55 | 125.9% | 7.73 |

Read Data Case Study

Referring generally to FIGS. 14-17, real collected data and analysis results for the GBHMMM 138 using the collected data are shown. The collected data used in the GBHMMM 138 is data gathered from advertisers in automobile category (e.g., data received and/or collected from data sources 110). The various benefits of using the GHBMMM 138 fit with the real data is discussed with reference to FIGS. 14-17.

Figure 14:
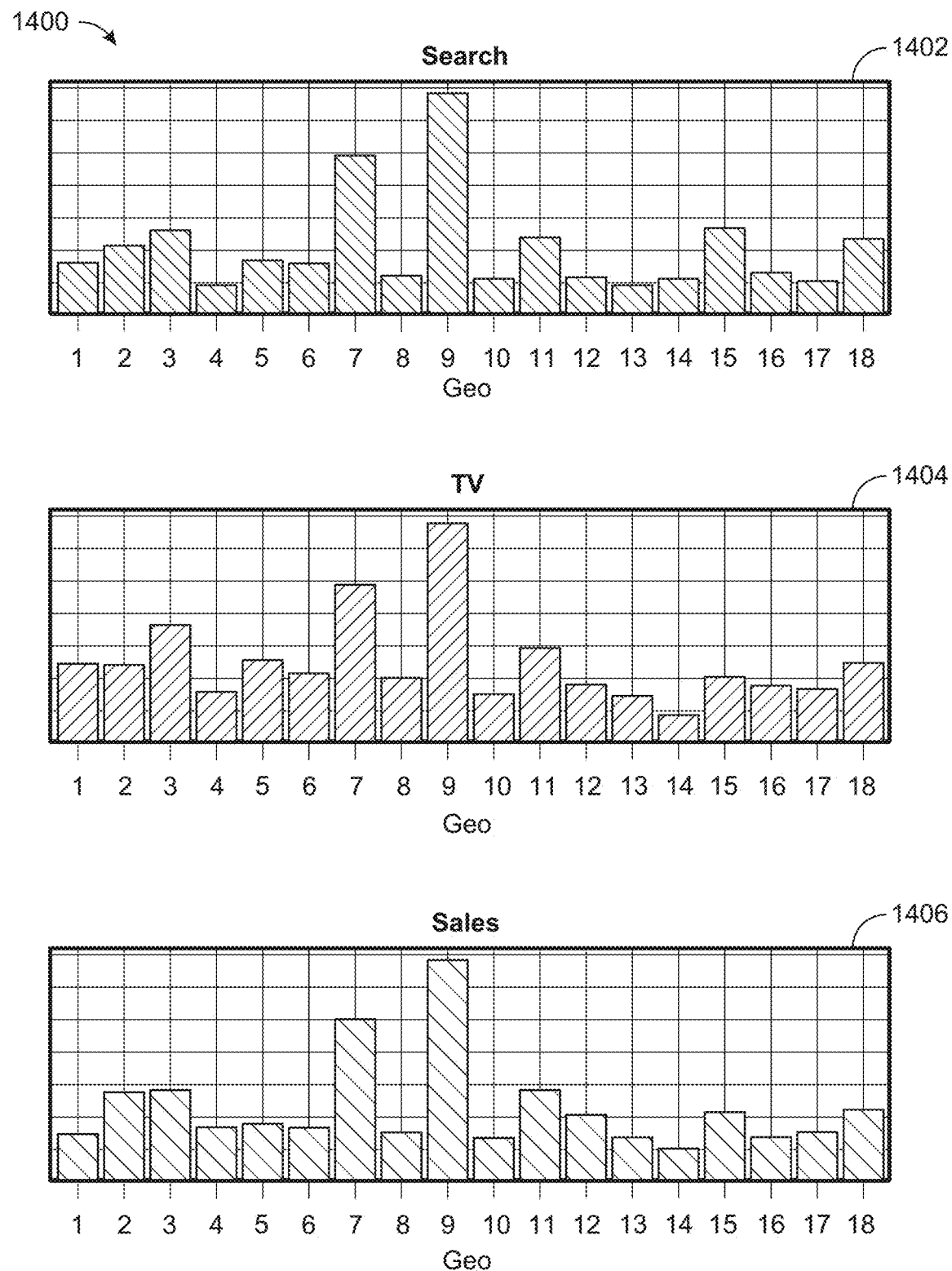
FIG. 14 is a set of charts illustrating real data that can be used to generate the GBHMMM according to an illustrative implementation.

The dataset shown in FIG. 14 includes monthly media mix data for 12 auto brands at 18 designated market areas (DMAs) in the United States from January, 2013 to December, 2014 (24 months). The designated market areas may be geographic areas in the United States in which local television viewing is measured by an entity e.g., Nielsen. The number of new car registrations was sourced from R.L. Polk & Company. The television ad spend was sourced from comScore, Inc. The Google search ad spend and search query volume were sourced from Google Inc. Other variables, including new car incentives, market price, tier two media spend, major and minor car model updates (redesigns) were provided by Neustar MarketShare, which consolidated data from sources such as Kantar Media, IRI, ITG, JD Power, and Rentrak. The ad spend may be controlled by local dealerships. MarketShart is a marketing analytics company.

The 18 DMAs cover more than 50% of total new car registrations in the entire category. Advertising for the 12 auto brands in the United States is dominated by television which includes more than 80% of tier one nameplate marketing budgets. The ad spend may come from the national advertising budget of an automobile manufacturer. The monthly dollar sales can be calculated by multiplying the number of car registrations with the average sales price of a brand at each DMA.

Referring now to FIG. 14, charts 1400 illustrate proportion of total sales, television ad spend and search ad spend across 18 geos of the auto category. Specifically, chart 1402 illustrates advertising spend for Internet searching at each of the 18 geos, chart 1404 illustrates television advertising spend at each of the 18 geos, while chart 1406 illustrates total sales for each of the 18 geos. FIG. 14 shows the distribution of sales, television ad spend, and search ad spend across 18 geos (the numbers are relative). These variables are positively correlated across geos because they are all confounded by the geo level target population size.

The target population size in each DMA is estimated by the average monthly sales during the entire sample period. The monthly sales and media spend in each DMA are standardized by the target population size to be the amount per capita. Transformed dollar sales can be logged to be the response variable. The media spends are transformed to be between zero and one, this standardization of variables is discussed further herein. There is little change in the market price over the two year period for the 12 brands and thus the price is not included in the model. Control variables are centered and scaled within each DMA.

The time of consideration of purchasing a car could be quite long and some ad channels, especially television, could have a delayed peak effect on sales. To model the carryover effect, we set the maximum duration of ad effect to be three months and employ the delayed adstock function defined in Equation 9. For media channels m=1, . . . , M, we use a uniform(0,1) prior on the carryover decay parameter $\alpha_m$ and a uniform(0,3) prior on the carryover delay parameter $\theta_m$. The shape effect is modeled by Hill transformation defined in Equation (3). We use a uniform(0,1) prior on $K_m$ and a gamma(1.5,0.5) prior on $S_m$. A normal(0,1) prior (e.g., a hyper-prior) can be placed for all the hyper-parameters $\tau$, $\beta$, $\gamma$. A customized Gibbs sampler with 10,000 iterations can be used to fit the model. The aggregated search query volume for the 12 brands in each DMA is included in the model to approximate the local seasonal demand for automobiles.

Figure 15:
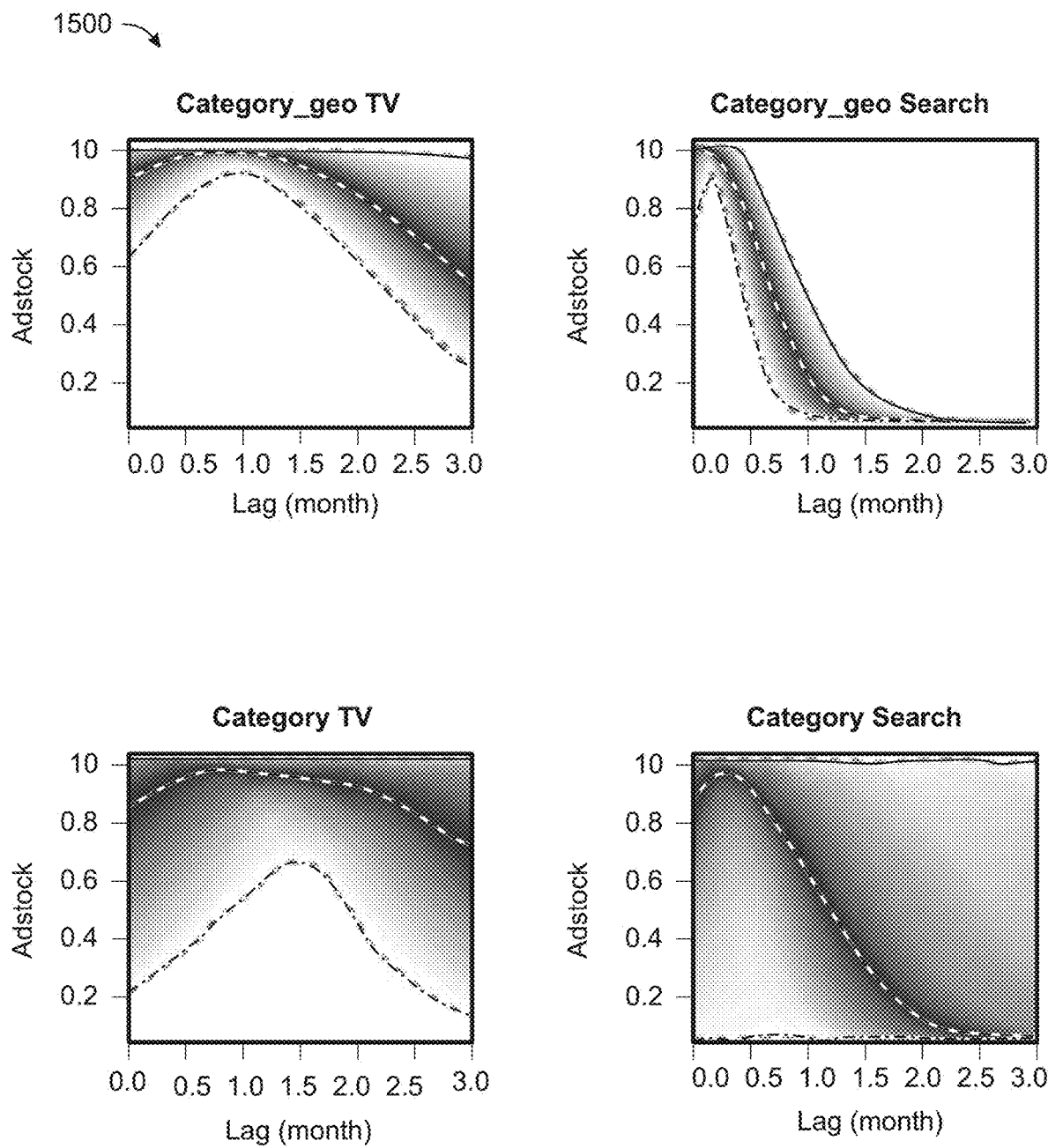
FIG. 15 is a set of charts illustrating posterior samples of a delayed adstock function of a category based GBHMMM generated based on the real data illustrated in FIG. 14 according to an illustrative implementation.
Figure 16:
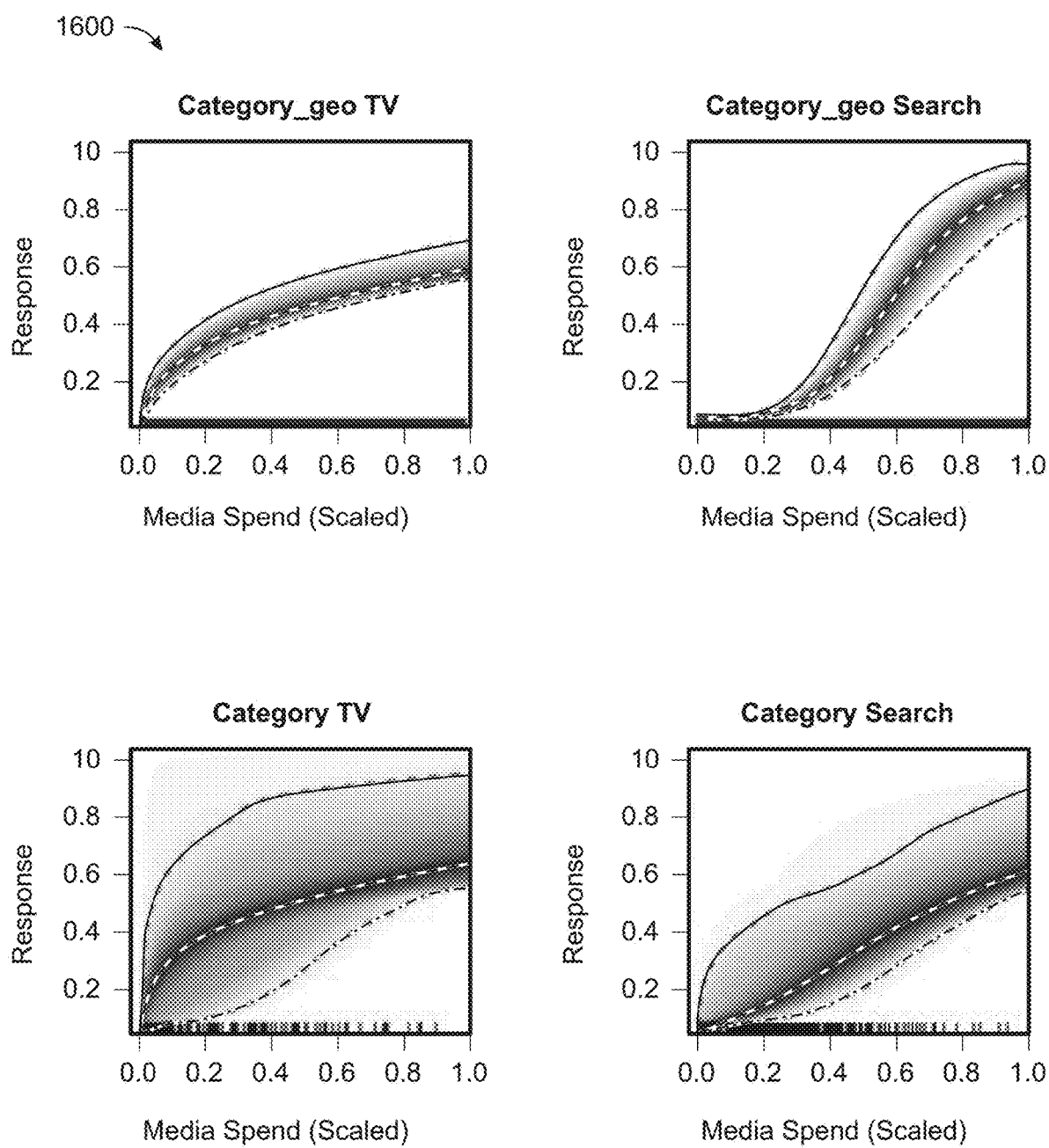
FIG. 16 is a set of charts illustrating posterior samples of a Hill function of the category based GBHMMM generated based on the real data illustrated in FIG. 14 according to an illustrative implementation.
Figure 17:
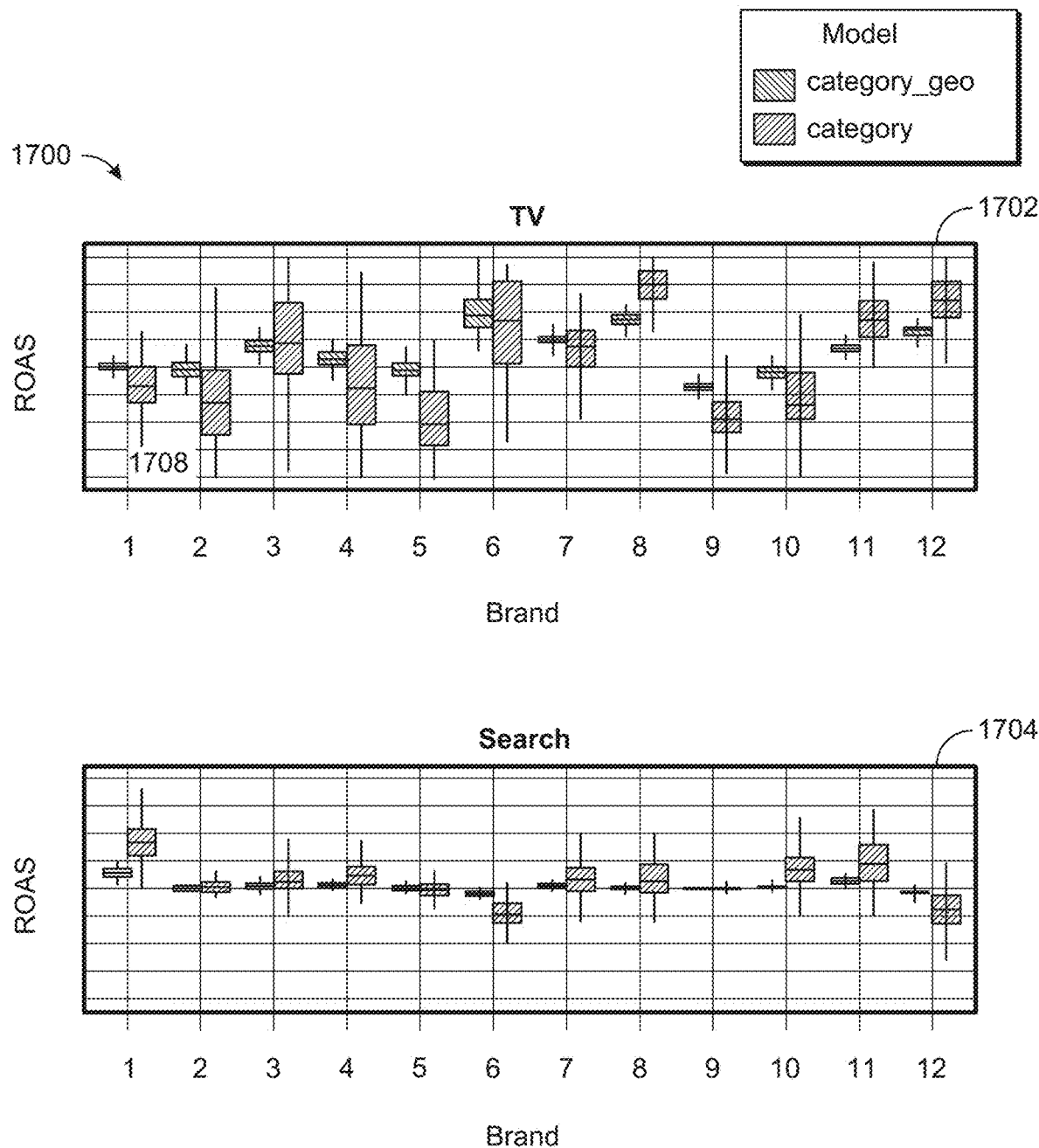
FIG. 17 is a set of charts illustrating the ROAS for the category based GBHMMM and a category based national-level BMMM generated based on the real data illustrated in FIG. 14 according to an illustrative implementation.

Referring generally to FIGS. 15-17, the performance of the models based on geo-level data and models based on national-level data is shown. The national-level data for a single brand only have 24 observations (monthly over the two-year period). Hence a comparison between the category-level model using the national-level data with the category-geo-level model (see Equations 15-19) to understand the benefit of the geo-level data can be done. The national-level media mix data for the entire category (12 brands) have 288 observations. The geo-level media mix data for the entire category have 288*18=5184 observations.

The category based GBHMMM yields considerably tighter credible intervals than the category base BMMM due to larger sample size and wider range of media spend. In FIG. 12, both models show that the television effect peaks around one month after the ad exposure and decays gradually over the next two months, while the search effect peaks around one to two weeks. FIG. 16 shows that the distribution of television spend at the national-level is extremely skewed with many observations at or close to zero while the search spend at the national-level is approximately normally distributed, with fewer observations close to zero. television seems to be closer to the saturation point at its maximum historical spend than search.

Referring now to FIG. 15, charts 1500 illustrate posterior samples of the delayed adstock functions are shown. The x-axis represents the number of lagged months and the y-axis represents the delayed adstock function taking values at the x-axis. Referring now to FIG. 16, charts 1600 illustrate posterior samples of the Hill functions. The x-axis is the scaled media variable ranging from zero to one and the y-axis represents the Hill transformation taking values at the x-axis. The tick marks along the x-axis shows the values of scaled media spend.

Referring now to FIG. 17, charts 1700 illustrate, via charts 1702 and 1704, the brand ROAS estimates at the national-level. The x-axis represents the 12 brands and y-axis represents the estimated ROAS values from the category-level model and the category-geo-level model. Each pair of box plots in charts 1702 and 17047 illustrate the ROAS for the category based GBHMMM and the category based national-level BMMM. Of each pair of box plots for each brand, the left box plot indicate the ROAS for the category based GBHMMM while the right box plot indicates the ROAS for the category based national-level BMMM.

FIG. 17 shows the boxplot of the posterior samples of the average ROAS at the national-level for 12 brands. The geo-level data reduces the estimation uncertainty in the ROAS estimates. The improvement varies across brands and channels, which could be a result of different media spend variation at the geo level.

Standardization of Variables

Referring again to FIGS. 1-2, data manager 126 can be configured to perform data scaling i.e., standardization of variables. A media variable can be rescaled to be relative to its minimum and maximum across times and geos (Equation 31), $$x_{t,m,g} = (x_{t,m,g} - \min_{t,g}(x_{t,m,g}))/(\max_{t,g}(x_{t,m,g}) - \min_{t,g}(x_{t,m,g})).$$

The relative ordering of a media variable across geos may be kept the same because the normalization function is the same across geos for each media channel. Note that this is not the only way to normalize media variables. Alternatively, if all the media variables are denominated in dollars, we could take the sum of total media spend in each time period (Equation 32), $$x_{t,\cdot,g} = \sum_{m=1}^{M} x_{t,m,g}$$

and rescale media variables relative to the range of total weekly ad spend or exposure across times and geos (Equation 32), $$x_{t,m,g} = (x_{t,m,g} - \min_{t,g}(x_{t,g}))/(\max_{t,g}(x_{t,g}) - \min_{t,g}(x_{t,g}))$$

The transformation on the media variable of the m-th channel can be denoted as $F_{x,m}(\cdot)$ for $m=1, \ldots, M$. No matter what transformations we apply to the response and media variables, we have to apply the inverse transformations to the model estimates afterwards.

The control variables can be centered within each geo and scaled. For example, the average household income may vary across geos, and as a result advertisers may set different baseline product prices in geos according to the income levels (Equation 33), $$z_{t,c,g} = \zeta_{c,g} + v_{t,c,g}$$

where $v_{t,c,g}$ is white noise and $\zeta_{c,g}$ is the baseline product price in geo g. Without centering $z_{t,c,g}$ the Bayesian estimate of the coefficient of $z_{t,c,g}$ would be highly correlated with the intercept of geo g. Also when both household income and product price serve as control variables, their coefficients would be correlated. On the other hand, with centering, the model would focus on explaining the impact of change in control variables within each geo and leave the difference of price across geos to the intercept. The centering and scaling also facilitate the use of common priors on the coefficients of the control variables. However, these transformations alter the meaning of the coefficients, so modellers should decide on a case by case basis what transformation is needed for the control variables.

Derivation of the Geo Level Correlation

Referring again to FIG. 4, underlying demand 426 can be determined. Letting the geo-level media spend be $x_{t,g}$ and the base demand be $h_{t,g}$ (Equation 34), $$x_{t,g} = u_g + \rho_g h_{t,g} + \sqrt{1-\rho_g^2} v_{t,g}$$

where $\rho_g = \text{Cor}(x_{t,g}, h_{t,g})$ is the correlation between the media spend and the base demand. It can be assumed that the geos are of equal size but the conclusion could be extended to the case that geos are of different sizes. As $u_g$, $g=1, \ldots, G$ are fixed, without loss of generality, we could set $u_g=0$ for $g=1, \ldots, G$ and $E(h_{t,g})=0$. We first consider a simple case that the geo-level base demand time series are the same $h_{t,g}=h_t$, $\text{Var}(h_t)=1$ and the correlations $\rho_g=\rho$, $g=1, \ldots, G$ are the same across geos.

As the geos are of equal size and variables are in the amount per capita, the national-level variables are simply averages of the geo-level variables, i.e., $$x_t = \Sigma_{g=1}^{G} x_{t,g} = \rho h_t + \sqrt{1-\rho^2} \frac{1}{G} \Sigma_{g=1}^{G} v_{t,g}$$

where $h_t$ is independent of the geo specific factor $v_{t,g}$. The correlation between the national-level media spend $x_t$ and the base demand $h_t$ is (Equation 35-37), $$Cor(x_t, h_t) = \frac{Cov(x_t, h_t)}{\sqrt{Var(h_t)Var(x_t)}}$$

$$= \frac{\rho Var(h_t)}{\sqrt{Var(h_t)\left(\rho^2 Var(h_t) + (1-\rho^2)\frac{1}{G}\right)}}$$

$$= \frac{\rho}{\sqrt{\rho^2 + \frac{1-\rho^2}{G \times Var(h_t)}}}$$

As $$Var(h_t) = 1, Cor(x_t, h_t) = \frac{\rho}{\sqrt{\rho^2 + \frac{1-\rho^2}{G}}} \geq \rho,$$

for $G \geq 2$ i.e., the national-level correlation between the media spend and the base demand is higher than that at the geo level.

It can be generalized that $h_{t,g}$ is not the same but positively correlated, i.e., $\text{Var}(h_{t,g})=1$, $g=1, \ldots G$ and $\text{Cor}(h_{t,m}, h_{t,l}) \geq 0$, $m \neq l$, at least one pair of geos have strictly positive correlation (Equation 38-41), $$\text{Var}(h_t) = \text{Var}\left(\frac{1}{G}\sum_{g=1}^{G} h_{t,g}\right)$$

$$= \frac{\Sigma_{l,m} \text{Cov}(h_{t,l}, h_{t,m})}{G^2}$$

$$> \frac{\Sigma_{g=1}^{G} \text{Var}(h_{t,g})}{G^2}$$

$$= \frac{1}{G}.$$

Hence $$\text{Cor}(x_t, h_t) > \frac{\rho}{\sqrt{\rho^2 + (1-\rho^2)}} = \rho,$$

i.e., the national-level correlation between the media spend and the base demand is higher than that at the geo level.

Figure 18:
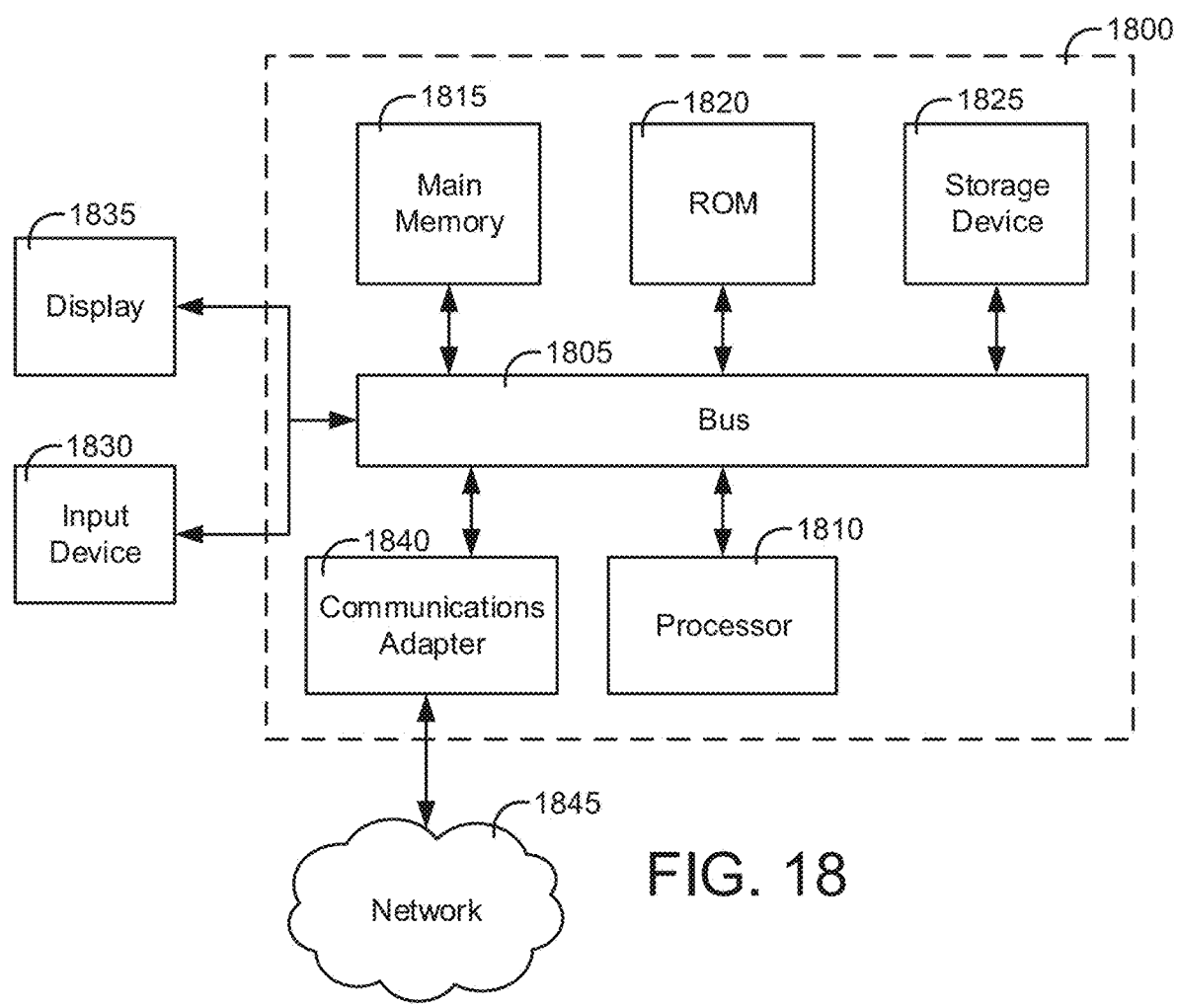
FIG. 18 is a block diagram of a computing system according to an illustrative implementation.

FIG. 18 illustrates a depiction of a computer system 1800 that can be used, for example, to implement an illustrative user device 104, an illustrative content management system 108, an illustrative content provider device 106, an illustrative analysis system 150, and/or various other illustrative systems described in the present disclosure. The computing system 1800 includes a bus 1805 or other communication component for communicating information and a processor 1810 coupled to the bus 1805 for processing information. The computing system 1800 also includes main memory 1815, such as a random access memory (RAM) or other dynamic storage device, coupled to the bus 805 for storing information, and instructions to be executed by the processor 1810. Main memory 1815 can also be used for storing position information, temporary variables, or other intermediate information during execution of instructions by the processor 1810. The computing system 1800 may further include a read only memory (ROM) 810 or other static storage device coupled to the bus 1805 for storing static information and instructions for the processor 1810. A storage device 1825, such as a solid state device, magnetic disk or optical disk, is coupled to the bus 1805 for persistently storing information and instructions.

The computing system 1800 may be coupled via the bus 1805 to a display 1835, such as a liquid crystal display, or active matrix display, for displaying information to a user. An input device 1830, such as a keyboard including alphanumeric and other keys, may be coupled to the bus 1805 for communicating information, and command selections to the processor 1810. In another implementation, the input device 1830 has a touch screen display 1835. The input device 1830 can include a cursor control, such as a mouse, a trackball, or cursor direction keys, for communicating direction information and command selections to the processor 1810 and for controlling cursor movement on the display 1835.

In some implementations, the computing system 1800 may include a communications adapter 1840, such as a networking adapter. Communications adapter 1840 may be coupled to bus 1805 and may be configured to enable communications with a computing or communications network 1845 and/or other computing systems. In various illustrative implementations, any type of networking configuration may be achieved using communications adapter 1840, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 800 in response to the processor 1810 executing an arrangement of instructions contained in main memory 1815. Such instructions can be read into main memory 1815 from another computer-readable medium, such as the storage device 1825. Execution of the arrangement of instructions contained in main memory 1815 causes the computing system 1800 to perform the illustrative processes described herein. One or more processors in a multi-processing arrangement may also be employed to execute the instructions contained in main memory 1815. In alternative implementations, hard-wired circuitry may be used in place of or in combination with software instructions to implement illustrative implementations. Thus, implementations are not limited to any specific combination of hardware circuitry and software.

Although an example processing system has been described in FIG. 18, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TELEVISION channel, on a satellite TELEVISION channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   generating a plurality of geographic regions by grouping one or more geographic sub-regions into each of the plurality of geographic regions, generating the plurality of geographic regions comprises:
   generating a first geographic region by grouping a first set of the geographic sub-regions; and
   generating a second geographic region by grouping a second set of the geographic sub-regions;
   receiving data for the geographic sub-regions, the data comprising responses, content inputs, content types, and location identifiers;
   generating geo-level data from the received data by grouping the responses and content inputs of the received data based on a correlation of the location identifiers of the received data to the plurality of geographic regions;
   fitting a Bayesian hierarchical model based on at least the geo-level data, the content types, and the geographic regions, wherein the Bayesian hierarchical model comprises a posterior distribution for response for each content type of the plurality of content types in each geographic region of the plurality of geographic regions; and
   determining a content input mix for the content types for each geographic region based on the Bayesian hierarchical model and a content input constraint, the content input mix indicating a particular content input for each of the plurality of content types in each of the plurality of geographic regions, the content input constraint indicating a total content input for each of the geographic regions, determining the content input mix for the content types for each geographic region comprises:
   determining a first content input mix for the content types for the first geographic region; and
   determining a second content input mix different than the first content input mix for the content types for the second geographic region.

2. The method of claim 1, wherein determining the content input mix for the content types
   for each geographic region comprises maximizing a posterior mean of a predicted response of the Bayesian hierarchical model; and
   wherein the content input mix is determined for a particular period of time.

3. The method of claim 1, wherein fitting the Bayesian hierarchical model comprises generating posteriors for one or more parameters of the Bayesian hierarchical model based on at least the geo-level data.

4. The method of claim 3, wherein the posteriors of the one or more parameters of the Bayesian hierarchical model are generated based on prior distributions for each of the parameters; and
   wherein the prior distributions are each based on one or more hyper-parameters.

5. The method of claim 4, wherein fitting the Bayesian hierarchical model further comprises fitting the Bayesian hierarchical model based on the plurality of hyper-parameters and a hyper-prior for each of the plurality of hyper-parameters.

6. The method of claim 1, the method further comprising:
   standardizing the geo-level data for the generated geographic regions by standardizing the responses and the content inputs of the geo-level data based on each population of the generated geographic regions; and
   normalizing the standardized geo-level data to be between zero and one.

7. The method of claim 1, wherein fitting the Bayesian hierarchical model with the geo-level data further comprises fitting the Bayesian hierarchical model based on a plurality of control variables and control variable types, the plurality of control variables and control variable types indicating conditions for each of the geographic regions at one or more points in time;

wherein the method further comprising standardizing the plurality of control variables based on a population of each geographic region.

8. The method of claim 1, wherein the Bayesian hierarchical model comprises one or more functions that models carryover, lag, and saturation effects, wherein the one or more functions comprise an adstock function and a Hill function.

9. A system comprising:
at least one computing device operably coupled to at least one memory and configured to:
generate a plurality of geographic regions by grouping one or more geographic sub-regions into each of the plurality of geographic regions by:
generating a first geographic region by grouping a first set of the geographic sub-regions; and
generating a second geographic region by grouping a second set of the geographic sub-regions;
receive data for the geographic sub-regions, the data comprising responses, content inputs, content types, and location identifiers;
generate geo-level data from the received data by grouping the responses and content inputs of the received data based on a correlation of the location identifiers of the received data to the plurality of geographic regions;
fit a Bayesian hierarchical model based on at least the geo-level data, the content types, and the geographic regions wherein the Bayesian hierarchical model comprises a posterior distribution for response for each content type of the plurality of content types in each geographic region of the plurality of geographic regions; and
determine a content input mix for the content types for each geographic region based on the Bayesian hierarchical model and a content input constraint, the content input mix indicating a particular content input for each of the plurality of content types in each of the plurality of geographic regions, the content input constraint indicating a total content input for each of the geographic regions, determining the content input mix for the content types for each geographic region comprises:
determining a first content input mix for the content types for the first geographic region; and
determining a second content input mix different than the first content input mix for the content types for the second geographic region.

10. The system of claim 9, wherein the computing device is configured to determine the content input mix for the content types for each geographic region comprises maximizing a posterior mean of a predicted response of the Bayesian hierarchical model; and
wherein the content input mix is determined for a particular period of time.

11. The system of claim 10, wherein the computing device is configured to standardize the geo-level data for the generated geographic regions by standardizing the responses and the content inputs of the geo-level data based on each population of the generated geographic regions.

12. The system of claim 10, wherein the computing device is configured to:
generate the Bayesian hierarchical model with the geo-level data further comprises fitting the Bayesian hierarchical model based on a plurality of control variables, the plurality of control variables indicating conditions for each of the geographic regions; and standardize the plurality of control variables based on a population of each geographic region.

13. The system of claim 9, wherein the computing device is configured to fit the Bayesian hierarchical model to generate posteriors for one or more parameters of the Bayesian hierarchical model.

14. The system of claim 13, wherein the posteriors of the one or more parameters of the Bayesian hierarchical model are generated based on prior distributions for each of the parameters; and
wherein the prior distributions are each based on one or more hyper-parameters.

15. The system of claim 14, wherein the computing device is configured to fit the Bayesian hierarchical model by fitting the Bayesian hierarchical model based on the one or more hyper-parameters and a hyper-prior for each of the hyper-parameters.

16. One or more non-transitory computer-readable storage media having instructions stored thereon that, when executed by at least one processor, cause the at least one processor to perform operations comprising:
generating a plurality of geographic regions by grouping one or more geographic sub-regions into each of the plurality of geographic regions, generating the plurality of geographic regions comprises:
generating a first geographic region by grouping a first set of the geographic sub-regions; and
generating a second geographic region by grouping a second set of the geographic sub-regions;
receiving data for the geographic sub-regions, the data comprising responses, content inputs, content types, and location identifiers;
generating geo-level data from the received data by grouping the responses and content inputs of the received data based on a correlation of the location identifiers of the received data to the plurality of geographic regions;
fitting a Bayesian hierarchical model based on at least the geo-level data, the content types, and the geographic regions, wherein fitting the Bayesian hierarchical model comprises generating posteriors for one or more parameters of the Bayesian hierarchical model; and
determining a content input mix for the content types for each geographic region based on the Bayesian hierarchical model and a content input constraint, the content input constraint indicating a total content input for each of the geographic regions, wherein determining the content input mix for the content types for each geographic region is based on the Bayesian hierarchical model, wherein the Bayesian hierarchical model comprises a posterior distribution for response for each content type of the plurality of content types in each geographic region of the plurality of geographic regions, and the content input constraint, determining the content input mix for the content types for each geographic region comprises:
determining a first content input mix for the content types for the first geographic region; and
determining a second content input mix different than the first content input mix for the content types for the second geographic region.

17. The one or more non-transitory computer-readable storage claim 16, wherein generating the posteriors for the one or more parameters of the Bayesian hierarchical model is based on at least the geo-level data and prior distributions for each of the one or more parameters.

18. The one or more non-transitory computer-readable storage claim 16, wherein determining the content input mix for the content types for each geographic region comprises maximizing a posterior mean of a predicted response of the Bayesian hierarchical model; and wherein the content input mix is determined for a particular period of time.

19. The one or more non-transitory computer-readable storage medium of claim 16, wherein fitting the Bayesian hierarchical model further comprises generating the Bayesian hierarchical model based on the plurality of hyper-parameters and a hyper-prior for each of the plurality of hyper-parameters.

20. The one or more non-transitory computer-readable storage medium of claim 16, wherein the Bayesian hierarchical model comprises one or more functions that models carryover, lag, and saturation effects, wherein the one or more functions comprise an adstock function and a Hill function.

* * * * *